US012644787B1

(12) United States Patent
McManus, Jr.

(10) Patent No.: US 12,644,787 B1
(45) Date of Patent: Jun. 2, 2026

(54) MULTI-AXIS FORCE MEASUREMENT METHOD AND ASSEMBLY

(71) Applicant: Mound Power LLC, Papillion, NE (US)

(72) Inventor: Richard A. McManus, Jr., Colorado Springs, CO (US)

(73) Assignee: Mound Power LLC, Colorado Springs, CO (US)

( * ) Notice: Subject to any disclaimer, the term of this patent is extended or adjusted under 35 U.S.C. 154(b) by 257 days.

(21) Appl. No.: 18/217,382

(22) Filed: Jun. 30, 2023

Related U.S. Application Data

(60) Provisional application No. 63/367,556, filed on Jul. 1, 2022.

(51) Int. Cl.
 *G01L 5/1627* (2020.01)
 *G01L 1/22* (2006.01)

(52) U.S. Cl.
 CPC .......... *G01L 5/1627* (2020.01); *G01L 1/2262* (2013.01)

(58) Field of Classification Search
 CPC ............................ G01L 5/1627; G01L 1/2262
 See application file for complete search history.

(56) References Cited

U.S. PATENT DOCUMENTS

| | | | | | |
|---|---|---|---|---|---|
| 4,483,203 | A | * | 11/1984 | Capper | ................. G01L 5/1627 |
| | | | | | 73/862.01 |
| 4,591,154 | A | * | 5/1986 | Santarone | .......... A63B 69/0002 |
| | | | | | 473/497 |
| 5,811,694 | A | * | 9/1998 | Kamentser | ............ G01L 5/1627 |
| | | | | | 73/862.632 |
| 6,016,097 | A | * | 1/2000 | Gardner | ................. G01B 7/002 |
| | | | | | 338/42 |
| 6,616,556 | B1 | * | 9/2003 | Osmudsen | ......... A63B 69/0002 |
| | | | | | 473/218 |
| 7,739,922 | B2 | * | 6/2010 | Inamori | .................. G01L 5/223 |
| | | | | | 73/862.044 |
| 9,022,884 | B2 | * | 5/2015 | Dunno, Jr. | ......... A63B 69/0002 |
| | | | | | 473/451 |
| 2009/0107207 | A1 | * | 4/2009 | Yamazaki | .............. G01G 21/22 |
| | | | | | 73/1.13 |
| 2017/0189775 | A1 | * | 7/2017 | Dunno, Jr. | ......... A63B 69/0002 |
| 2021/0128840 | A1 | * | 5/2021 | Lilly | ..................... A61M 5/178 |

FOREIGN PATENT DOCUMENTS

| | | | | | | |
|---|---|---|---|---|---|---|
| CN | 101490516 | A | * | 7/2009 | ............. | G01G 19/44 |
| JP | H08481 | U | * | 3/1996 | | |
| KR | 100695652 | B1 | * | 3/2007 | .......... | B25J 17/0275 |
| KR | 20210043731 | A | * | 4/2021 | ........... | G01L 1/2281 |

* cited by examiner

*Primary Examiner* — Octavia Hollington
(74) *Attorney, Agent, or Firm* — Suiter Swantz IP

(57) ABSTRACT

A user force-application measurement system comprising: a base portion including: at least one cavity defining at least one surface; an upper portion including: at least one plunger assembly operably coupled to a rigid plate; and at least one force transducer. The at least one force transducer may be disposed between the at least one plunger assembly and the at least one surface of the at least one cavity when the at least one plunger assembly is received within the at least one cavity.

19 Claims, 33 Drawing Sheets

7a                7

5a

5b

MULTI-AXIS FORCE MEASUREMENT METHOD AND ASSEMBLY

PRIORITY

The present application claims priority under 35 U.S.C. § 119 to U.S. Application Ser. No. 63/367,556, filed on Jul. 1, 2022, entitled MULTI-AXIS FORCE MEASUREMENT METHOD AND ASSEMBLY, naming INVENTOR as an inventor, which is incorporated herein by reference in its entirety to the extent it is consistent herewith.

FIELD OF THE INVENTION

The present invention relates to the collection and analysis of multi-axis force measurements. More particularly, the present invention relates to a system for the collection and analysis of ground reaction forces in one or more orthogonal axes.

BRIEF SUMMARY OF THE INVENTION

A user force-application measurement system comprising: a base portion including: at least one cavity defining at least one surface; an upper portion including: at least one plunger assembly operably coupled to a rigid plate; and at least one force transducer. The at least one force transducer may be disposed between the at least one plunger assembly and the at least one surface of the at least one cavity when the at least one plunger assembly is received within the at least one cavity.

BRIEF DESCRIPTION OF THE DRAWINGS

Some embodiments of the present invention are illustrated as examples and are not limited by the figures of the accompanying drawings, in which like references may indicate similar elements and in which.

DETAILED DESCRIPTION

Figure 1:
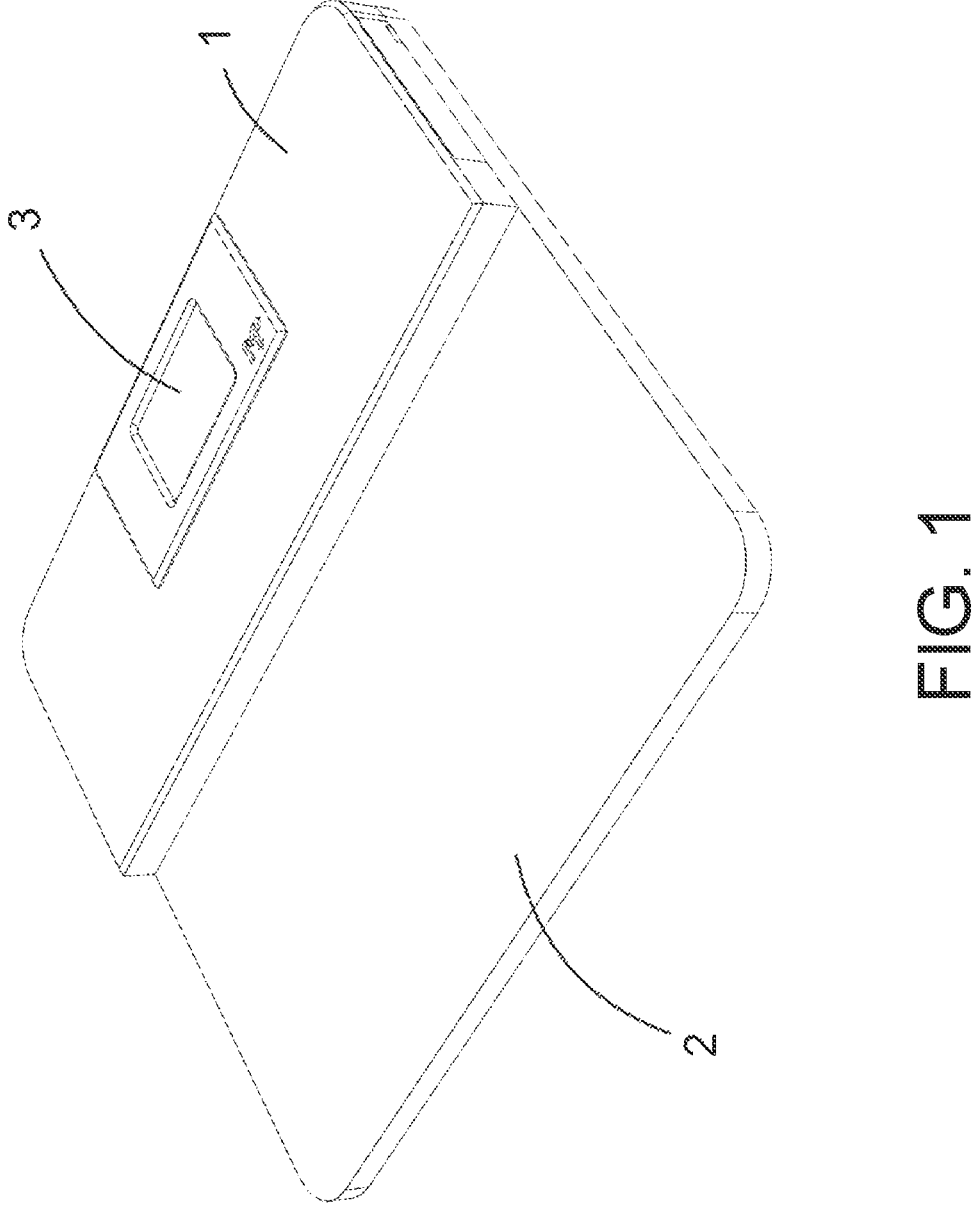
FIG. 1 depicts a side perspective view of one example of a multi-axis force-measuring assembly with a surface tailored for baseball pitchers according to the various embodiments described herein.

In describing the method and assembly presented herein, each technique or component has unique characteristics that can be applied independently or in combination with other identified techniques or components. The present method and assembly disclosures are considered illustrative and are not intended to limit the invention to the specific embodiments illustrated by the figures or description herein.

As used herein, the terms "a," "an," and "the" are intended to include the plural forms as well as the singular forms, unless the context clearly indicates otherwise. It will be further understood that the terms "comprises", "comprising", "include", and "including", when used in this specification, specify the presence of stated features, steps, operations, elements, and/or components, but do not preclude the presence or addition of one or more other features, steps, operations, elements, components, and/or groups thereof.

The present invention may comprise but is not limited to 1) one or more rigid upper plates, 2) one or more ground contact legs that move freely relative to the rigid upper plate but maximize friction with the ground, 3) one or more force transducers embedded in ground contact legs, 4) one or more low-friction transducer contact points fixed to the rigid upper plate, 5) one or more ground contact leg sockets intended to prevent the removal of ground contact legs, 6) embedded electrical hardware and wiring, 7) integrated software connections (wired and wireless), 8) a power supply (battery or otherwise), and/or 9) one or more upper surfaces tailorable to a user's activity of choice.

The present invention may include hardware and/or software to capture, record, store, process, and transform collected force data into user-friendly formats that may be displayed by a companion application or other means. Such hardware and software may implement but is not limited to methods for 1) automatic determination of beginning and end points for data collection and data cropping to omit extraneous data, 2) automated calculation of maximum force values in each orthogonal axis, gross forces, vector angles, impulses, centers of pressure, torque, and force distribution relative to each gross vector, 3) automated real-time synchronization of videos and multi-axis force measurements, and/or 4) audible and visual feedback.

The present methods and assembly will now be described referencing the figures representing three variations of multi-axis force measurement embodiments. The present invention may be modified or tailored for specific activities such as but not limited to measuring the rear leg ground-reaction forces generated by baseball pitchers. For example, the embodiments depicted by the figures include a pitching rubber and turf surface fixed to the upper surface of the rigid upper plate. Surfaces may be tailored to accommodate other activities (e.g., swimmer's diving platforms, golfer's tee boxes, runner's starting blocks, etc.) depending on a user's specific needs. Additionally, assemblies may be modified for the environment and predominant measurements required for the desired activity.

FIG. 1 depicts a side perspective view of one embodiment of a multi-axis force-measuring assembly (depicted by FIG. 1-8) including a raised pitching rubber 1 covering roughly one third of a rigid upper plate 2. This rubber is intended to enable proper foot placement and provide a realistic sensation for the pitcher. A liquid-crystal display (LCD) screen 3 embedded within the pitching rubber may display force measurements directly on the assembly. The user may stand on the rigid upper plate 2 while performing a force producing activity. In this embodiment, a pitcher may place their rear foot on the assembly while pitching to receive quantitative ground-reaction force data for analyzing performance.

Figure 2:
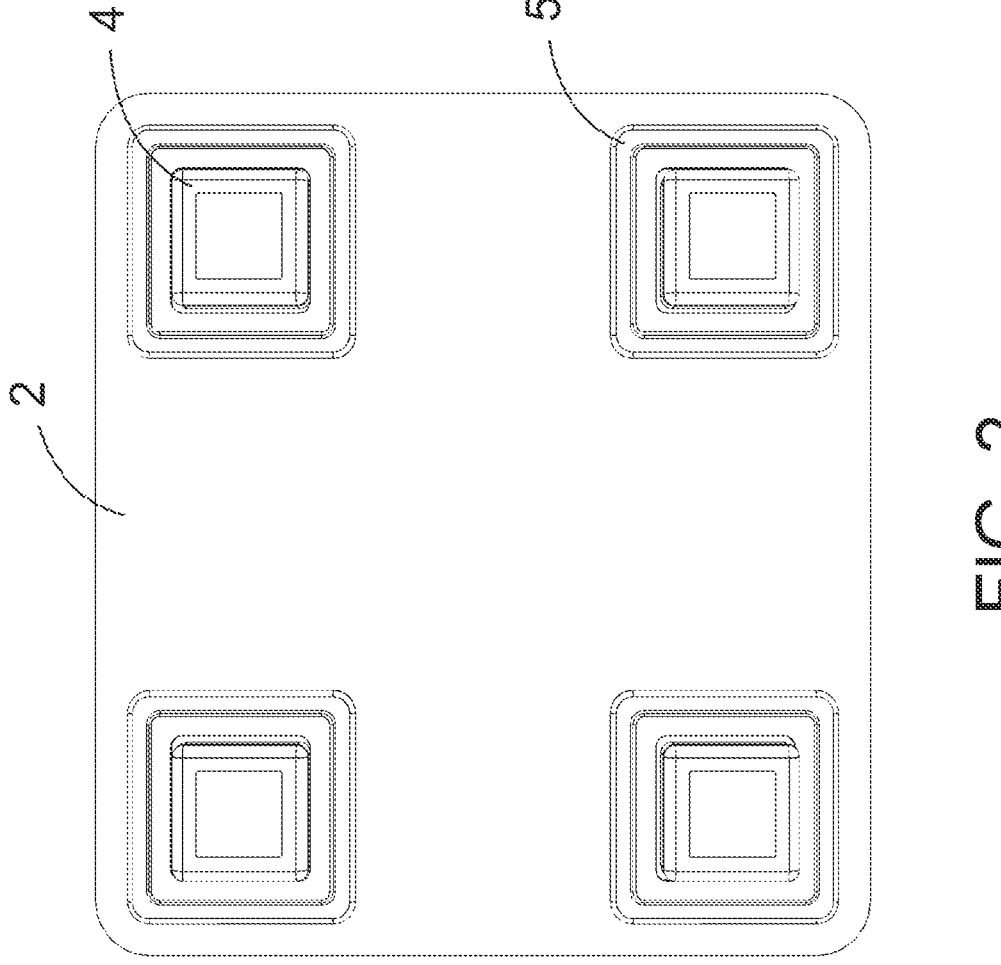
FIG. 2 displays a bottom view of one example of a multi-axis force-measuring assembly including a rigid upper plate and ground contact leg assemblies according to the various embodiments described herein.

FIG. 2 displays the bottom view or underside of one embodiment of a multi-axis force-measuring assembly. Ground contact leg sockets 5 remain fixed to the rigid upper plate 2 and are configured to maintain proper positioning of ground contact legs 4 while preventing inadvertent removal. Four ground contact legs 4 rest on and grip the surface of the ground during use to prevent the greater force-measuring assembly from moving relative to the ground. Users of such a force-measuring assembly may desire to stake, clamp, or fix the ground contact legs 4 to the surface of the ground by other means to further prevent movement between the ground contact legs 4 and the ground. In this embodiment, wires run from force transducers 7 (e.g., load cells, strain gauges, piezoresistive force sensors, and the like) (FIG. 3) in the ground contact legs 4 to the underside of the pitching rubber 1 (FIG. 1) where additional hardware may be housed.

Figure 3:
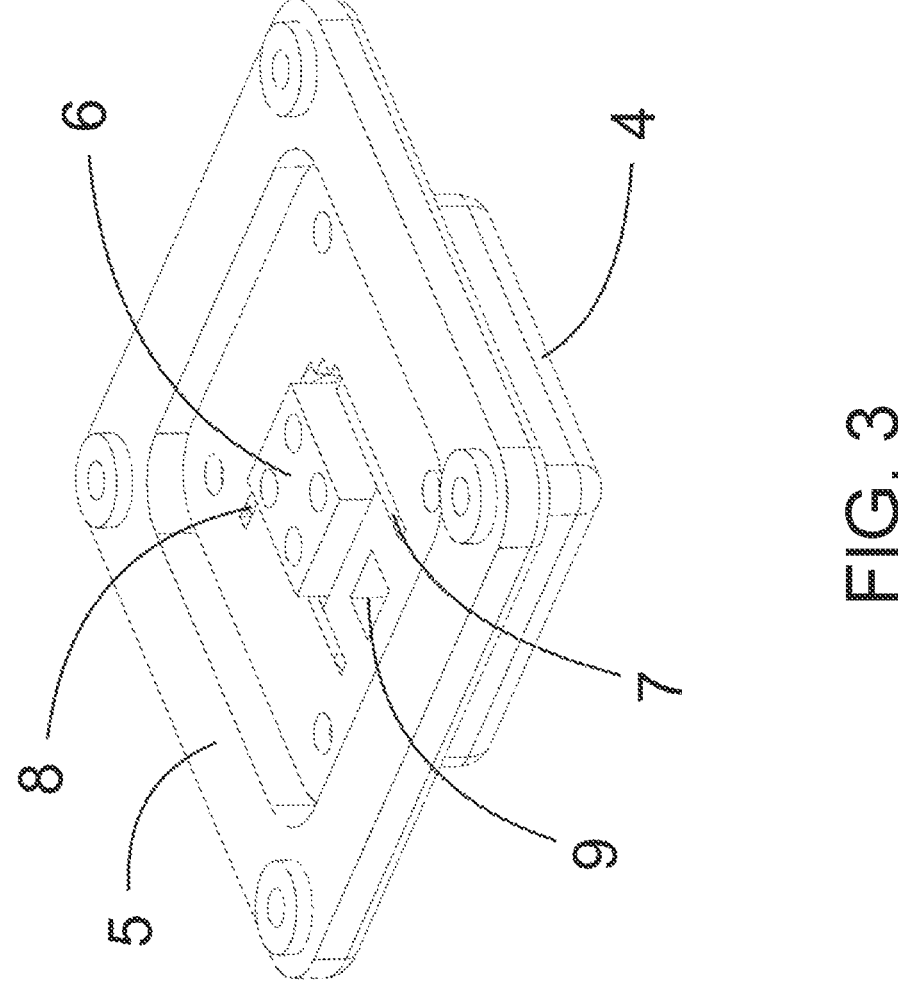
FIG. 3 illustrates a side perspective view of an example of a ground contact leg assembly with force transducers oriented on multiple orthogonal axes according to the various embodiments described herein.

A side perspective view of an example ground contact leg assembly is depicted in FIG. 3. Each ground contact leg assembly 4 may house one or more force transducers 7 oriented to measure forces in one or more orthogonal axes within one or more cavities defined by the ground contact legs 4. This embodiment of a ground contact leg assembly 4 includes force transducers 7 oriented to collect forces in three orthogonal axes (vertical, horizontal, and lateral). Transducers oriented on the same axis may measure forces in opposite directions with one direction correlating to positive force and the opposing direction correlating to negative force. Note, this embodiment of a ground contact leg assembly depicted in FIG. 3 only includes one transducer 8 for the horizontal axis as baseball pitchers do not typically generate force propelling them away from home plate. An additional force transducer may be placed opposite the force transducer 8 so as to collect both positive and negative force measurements in both horizontal directions and is added in later embodiments.

Note that force transducers oriented on the vertical axis are not visible in FIG. 3 as they are hidden by the plunger assembly 6. When force is applied to the rigid upper plate 2 (FIGS. 1, 2, 7, and 8) corresponding force is transferred to the plunger assemblies 6 causing the low-friction plunger protrusions 10 (FIG. 4) to interact with the force transducers 7 embedded within the ground contact legs 4. This occurs as only the ground contact leg sockets 5 and the plunger assemblies 6 are fixed to the rigid upper plate 2 (FIGS. 1, 2, 7, and 8). The ground contact legs 4 maximize friction with the ground preventing movement. This friction prevents the ground contact legs 4 and embedded force transducers 7 from moving relative to the ground but allows the rigid upper plate 2 (FIGS. 1, 2, 7, and 8), ground contact leg sockets 5, and plunger assemblies 6 to move during the application of external force. This movement allows the plunger assemblies 6 to interact with the force transducers 7 to collect force measurements. The protrusion around the perimeter of the top of a ground contact leg 4 is unable to pass through the narrower opening of the ground contact leg socket 5 while the width of the ground contact leg socket 5 around both the base and upper protrusion of the ground contact leg 4 is large enough to allow relative movement between both components in the horizontal and lateral directions. A vertical gap exists between the upper surface of the ground contact leg 4 and the lower surface of the rigid upper plate 2 (FIGS. 1, 2, 7, and 8) allowing relative movement between both components when a force is applied to the rigid upper plate 2 (FIGS. 1, 2, 7, and 8). The current embodiment includes a small rectangular hole 9 that provides room for electrical lead wires from force transducers 7 (FIGS. 3 and 6) to pass through the ground contact leg 4 and into the rigid upper plate 2 (FIGS. 1, 2, 7, and 8).

Figure 4:
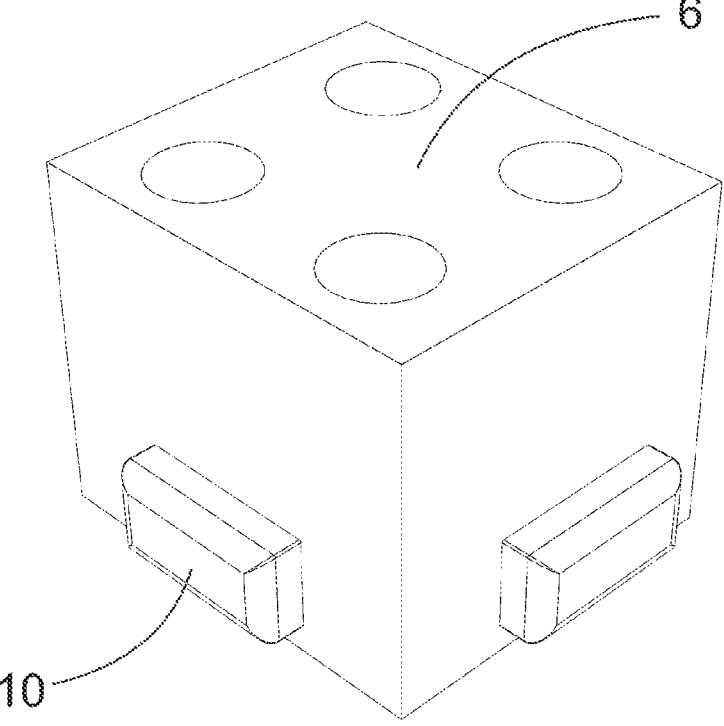
FIG. 4 depicts a side perspective view of an example of a plunger assembly according to the various embodiments described herein.

FIG. 4 depicts a side perspective view of an example plunger assembly 6. As described previously, the upper surface of the plunger assemblies 6 are fixed to a rigid upper plate 2 (FIGS. 1, 2, 7, and 8) and rest within cavities in the ground contact legs 4 (FIGS. 2, 3, 6, and 8). In alternate embodiments, the locations of cavities in the ground contact legs 4 and the plunger assembly 6b may be reversed with the cavities being incorporated into the rigid upper plate 2b while the plunger assembly 6b is fixed to the ground contact leg 4b.

Protrusions from the plunger assembly 10 may be composed of a low-friction material such as but not limited to polytetrafluoroethylene (PTFE) to reduce friction. In embodiments, such protrusions 10 are positioned to interact with force transducers 7 (FIGS. 3 and 6) embedded within the ground contact legs 4 (FIGS. 2, 3, 6, and 8) when force is applied to the rigid upper plate 2 (FIGS. 1, 2, 7, and 8).

Figure 5:
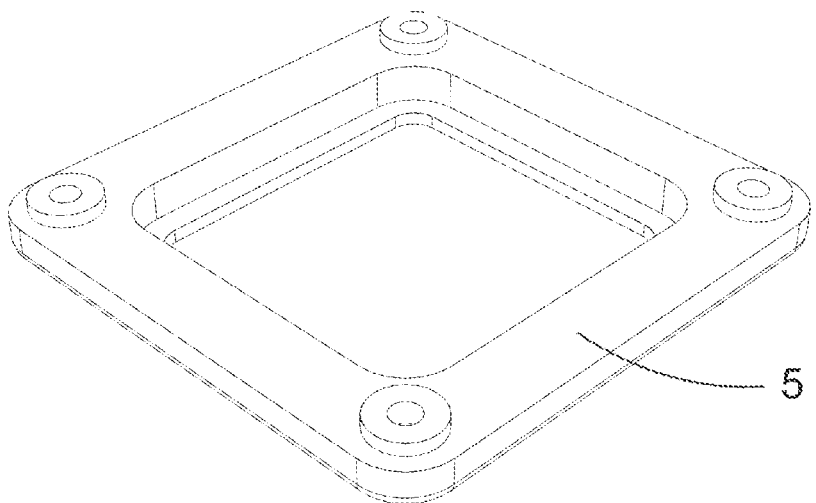
FIG. 5 displays a side perspective view of an example of a ground contact leg socket according to the various embodiments described herein.

FIG. 5 depicts a side perspective view of an example ground contact leg socket 5 as previously described. In embodiments, the ground contact leg socket 5 remains fixed to the rigid upper plate 2 (FIGS. 1, 2, 7, and 8) but allows movement with respect to the ground contact legs 4 (FIGS. 2, 3, 6, and 8). Additionally, the ground contact leg socket 5 prevents the removal of ground contact legs 4 (FIGS. 2, 3, 6, and 8) from the greater force-measuring assembly without restricting relative movement between ground contact legs 4 (FIGS. 2, 3, 6, and 8) and the greater force-measuring assembly within a certain tolerance.

Figure 6:
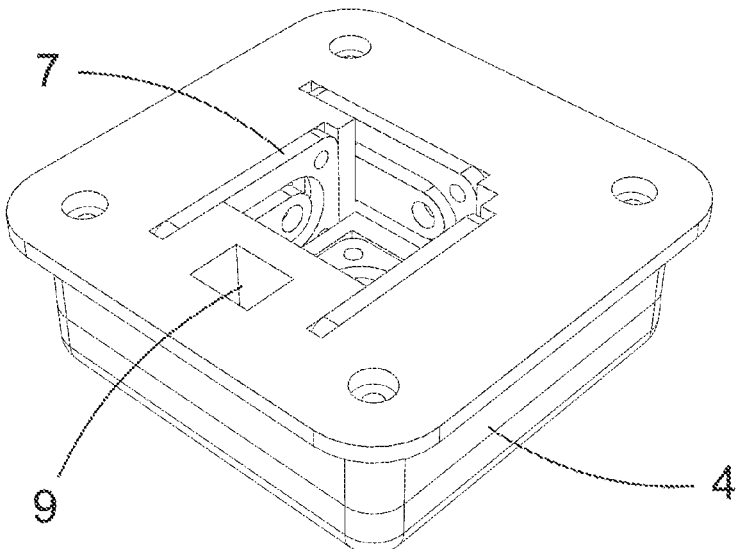
FIG. 6 illustrates a side perspective view of an example of a ground contact leg with variously oriented force transducers according to the various embodiments described herein.

FIG. 6 depicts a side perspective view of an example ground contact leg 4 with four orthogonally-oriented embedded force transducers 7 fixed to the interior surface of the ground contact leg 4. The ground contact leg 4 is not fixed to the rigid upper plate 2 (FIGS. 1, 2, 7, and 8) but is prevented from being removed from the greater force-measuring assembly by the ground contact leg socket 5 (FIGS. 2, 3, 5, 7, and 8).

Figure 7:
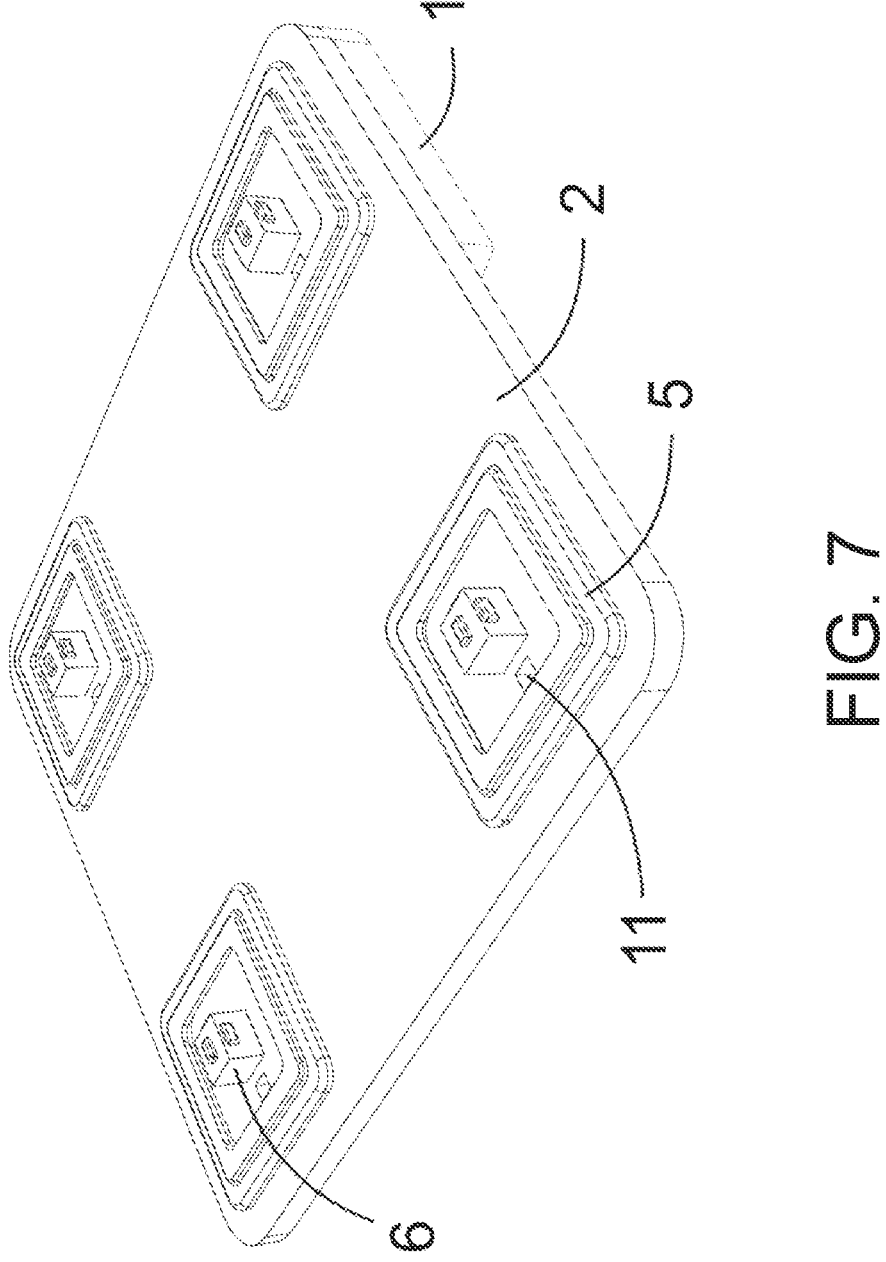
FIG. 7 depicts a side perspective view of the underside of an example of a multi-axis force-measuring assembly with the omission of ground contact legs according to the various embodiments described herein.
Figure 8:
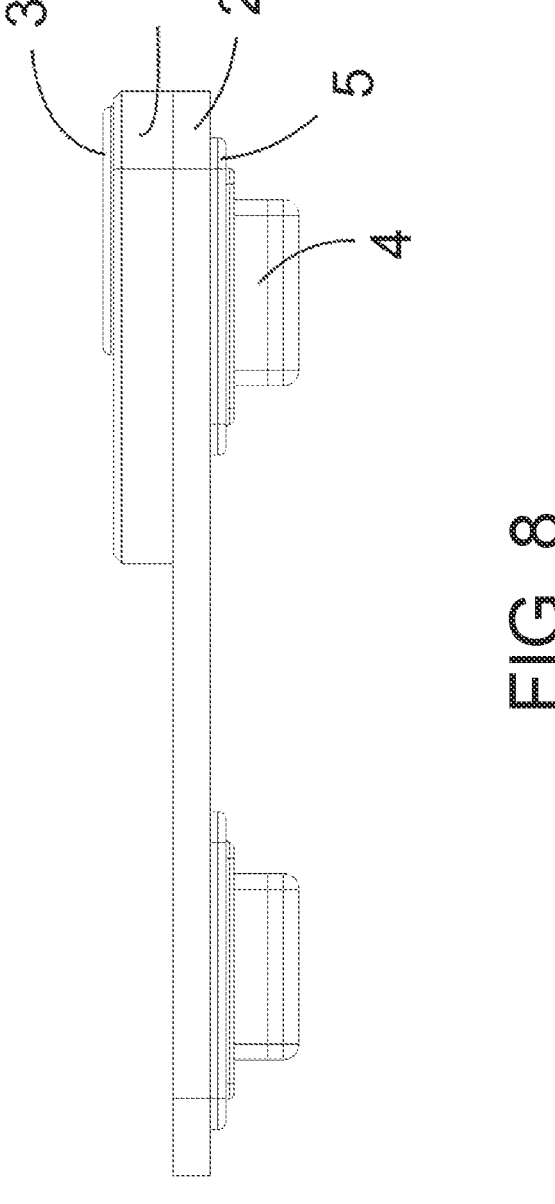
FIG. 8 displays a side view of an example of a multi-axis force-measuring assembly according to the various embodiments described herein.

FIG. 7 shows a side perspective view of the bottom of one embodiment of a force-measuring assembly with the omission of ground contact legs 4 (FIGS. 2, 3, 6, and 8). The omission in this embodiment makes visible only the components attached to the rigid upper plate 2. Four ground contact leg sockets 5 and four plunger assemblies 6 are fixed to the underside of the rigid upper plate 2 and therefore move with the rigid upper plate 2 during the application of force. The small rectangular cutouts 11 in the rigid upper plate 2 allow wires from force transducers 7 (FIGS. 3 and 6) to run to the hardware located within the pitching rubber 1 (FIGS. 1 and 8).

FIG. 8 displays a side view of one embodiment of a multi-axis force-measuring assembly. The displayed components from bottom to top are the: 1) ground contact legs 4, 2) ground contact leg sockets 5, 3) rigid upper plate 2, 4) pitching rubber 1, and 5) LCD screen 3. This configuration creates a realistic platform for athletes that is compact for portability.

Figure 9:
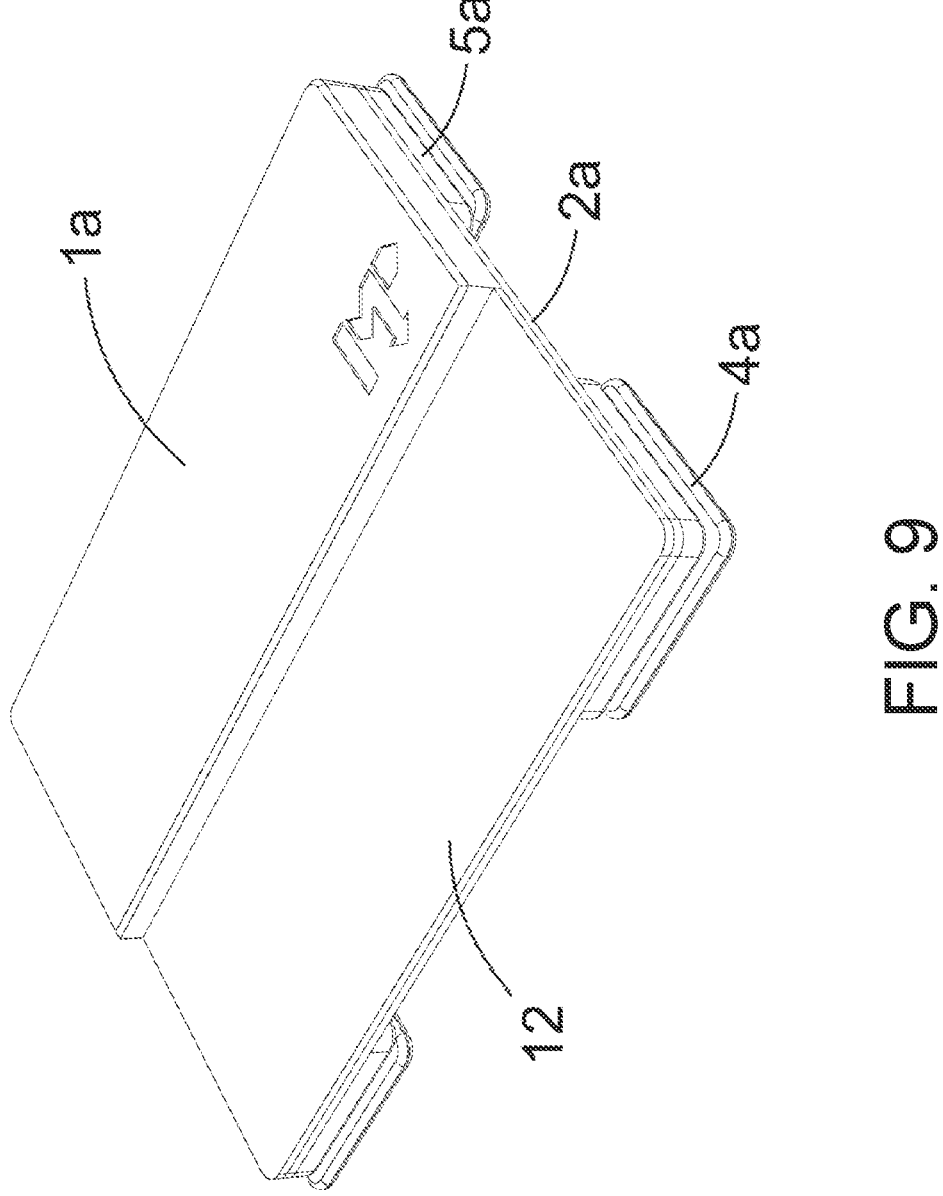
FIG. 9 illustrates a side perspective view of a second example of a multi-axis force-measuring assembly tailored for a baseball pitcher modified according to the various embodiments described herein.

FIG. 9 depicts a side perspective view of a second embodiment of a multi-axis force-measuring assembly (depicted in FIG. 9-18) and reflects several revisions. First, the LCD screen 3 (FIGS. 1 and 8) was removed and replaced with wireless transmission to a mobile device. Second, the position of the electrical hardware was moved underneath the rigid upper plate 2a and embedded within a single-body ground contact leg socket 5a. Third, artificial turf 12 was fixed to the top of the rigid upper plate 2a to improve the realistic sensation for a baseball pitcher. Fourth, horizontal transducers 7a (FIGS. 11, 12, and 13) were reduced in width to minimize the vertical distance from the rigid upper plate 2a to the ground. Fifth, ground contact legs 4a were revised to improve ground contact, compensate for the reduced width of horizontal transducers 7a (FIGS. 11, 12, and 13), extend beyond the horizontal dimensions of the rigid upper plate 2a, and enable the ground contact legs 4a to rest against an external object (such as a pitching rubber fixed to a mound or a wall) without impacting data collection methods or restricting necessary movement of the rigid upper plate.

Figure 10:
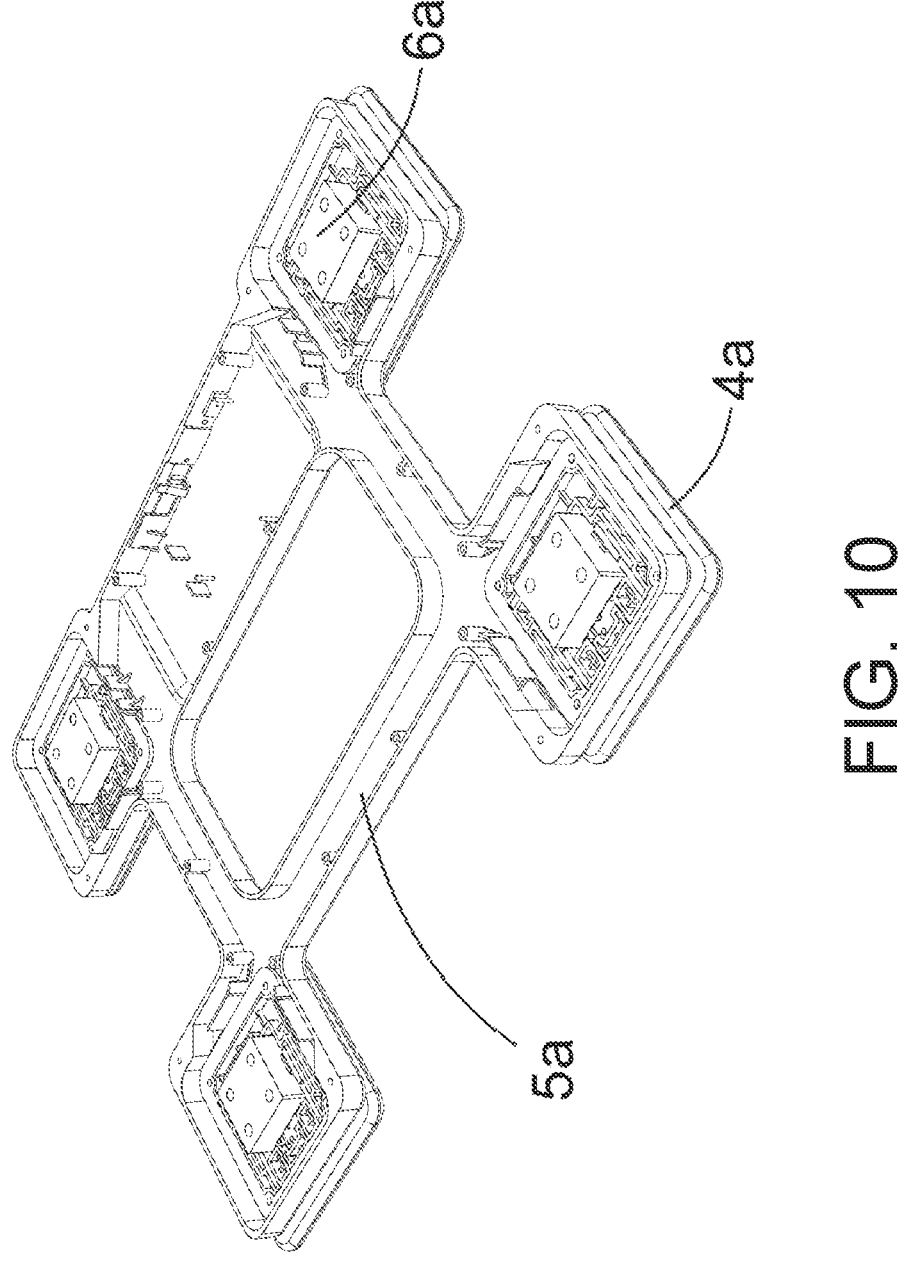
FIG. 10 depicts a side perspective view of an example of revised ground contact leg assemblies, corresponding plunger assemblies, and an example of a single-body ground contact leg socket according to the various embodiments described herein.
Figure 18:
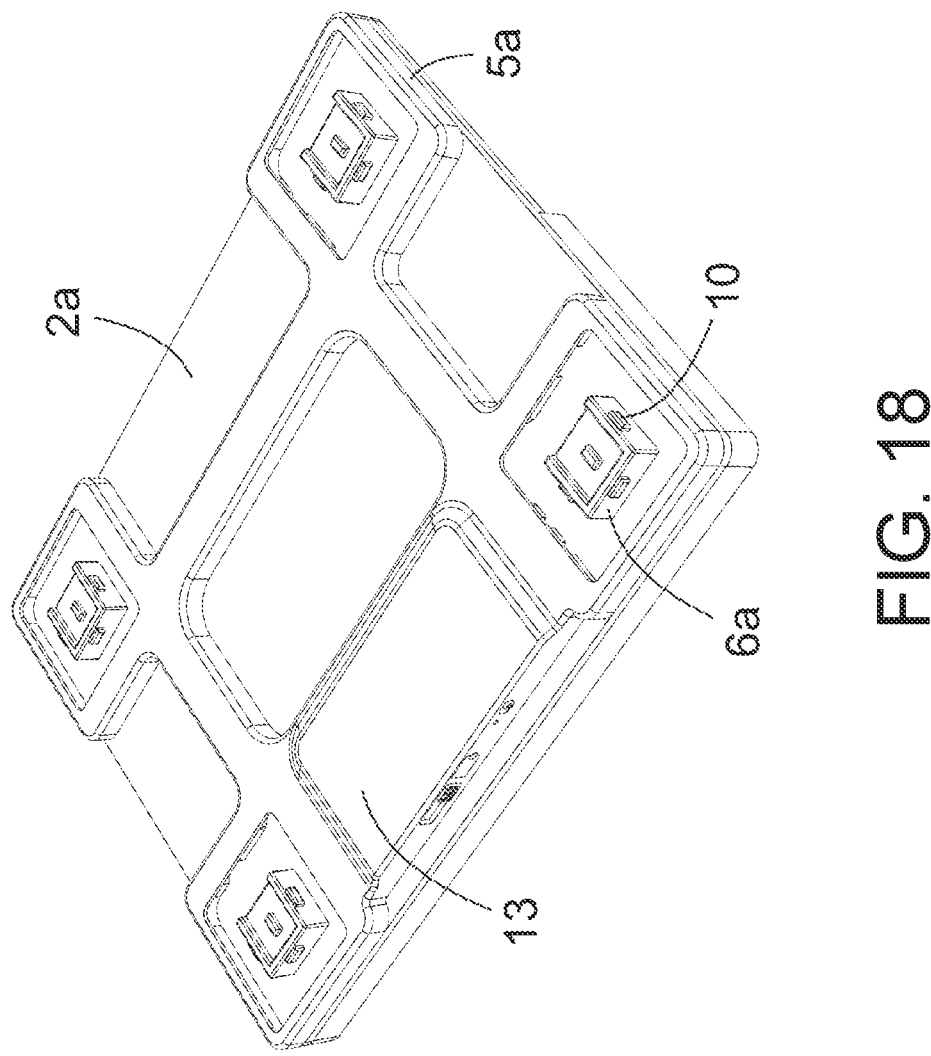
FIG. 18 depicts a side perspective view of the bottom of a second example of a multi-axis force-measuring assembly with the omission of ground contact legs according to the various embodiments described herein.

FIG. 10 depicts a side perspective view of a second embodiment of a multi-axis force-measuring assembly with the omission of a pitching rubber 1a (FIG. 9), turf 12 (FIG. 9), and rigid upper plate 2a (FIGS. 9 and 18). The omission in this embodiment makes visible four ground contact legs 4a, the corresponding four plunger assemblies 6a, and a single-body ground contact leg socket 5a that provides a channel to house wiring and embedded electrical hardware. The protrusion around the perimeter of the top of a ground contact leg 4a is unable to pass through the narrower opening of the single-body ground contact leg socket 5a preventing the ground contact leg's 4a removal from the greater force-measuring assembly.

However, the width of the single-body ground contact leg socket 5a around both the base and upper protrusion of the ground contact leg 4a is large enough to allow relative movement between both components in the horizontal and lateral directions. A narrower body of the ground contact leg 4a between upper and lower protrusions provides a vertical gap between the lower protrusion of the ground contact leg 4a and the lower surface of the single-body ground contact leg socket 5a. A second vertical gap exists between the upper surface of a ground contact leg 4a and the lower surface of the rigid upper plate 2a (FIGS. 9 and 18). Such vertical gaps allow vertical relative movement between both components when force is applied to the rigid upper plate 2a (FIGS. 9 and 18). Also depicted are four plunger assemblies 6a located within the ground contact legs 4a. When force is applied to the rigid upper plate 2a (FIGS. 9 and 18) corresponding force is transferred to the plunger assemblies 6a causing low-friction plunger assembly protrusions 10

(FIGS. 15 and 16) to interact with the force transducers 7 and 7a (FIGS. 11, 12, and 13) embedded within the ground contact legs 4a. This occurs as only the single-body ground contact leg socket 5a and plunger assemblies 6a are fixed to the rigid upper plate 2a (FIGS. 9 and 18). The ground contact legs 4a maximize friction with the ground preventing movement. The bottom surface of the ground contact leg 4a may be outfitted with rubber, foam, or another material to increase friction with the ground. This friction prevents the ground contact legs 4a and force transducers 7 and 7a (FIGS. 11, 12, and 13) from moving relative to the ground but allows the rigid upper plate 2a (FIGS. 9 and 18), single-body ground contact leg socket 5a, and plunger assemblies 6a to move during the application of external force. This movement allows the plunger assemblies 6a to interact with the force transducers 7 and 7a (FIGS. 11, 12, and 13) to collect force measurements.

Figure 11:
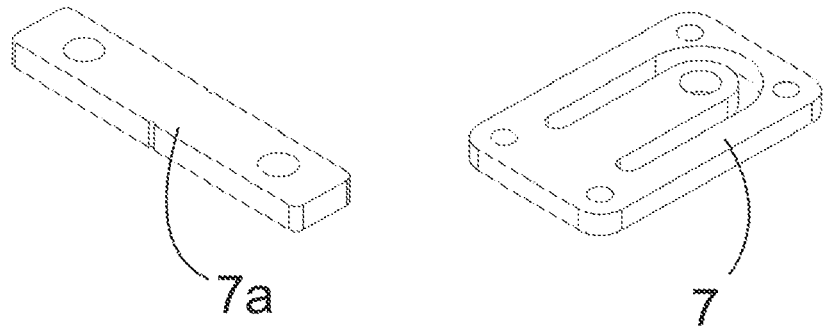
FIG. 11 displays side perspective views of two examples of force transducers that are strain gauge load cells that may be utilized according to the various embodiments described herein.

FIG. 11 displays side perspective views of two example force transducers 7 and 7a. The transducers 7 and 7a depicted are strain gauge load cells but the present invention is not limited to this type of transducer. The smaller load cells 7a capture side-to-side and forward-to-rear forces in the embodiment; the larger load cells 7 capture downward force in the embodiment. These load cells may vary in size, shape, and configuration to accommodate the primary direction of expected forces and expected loads relevant to different applications and may be exchanged for other force measuring transducers.

Figure 12:
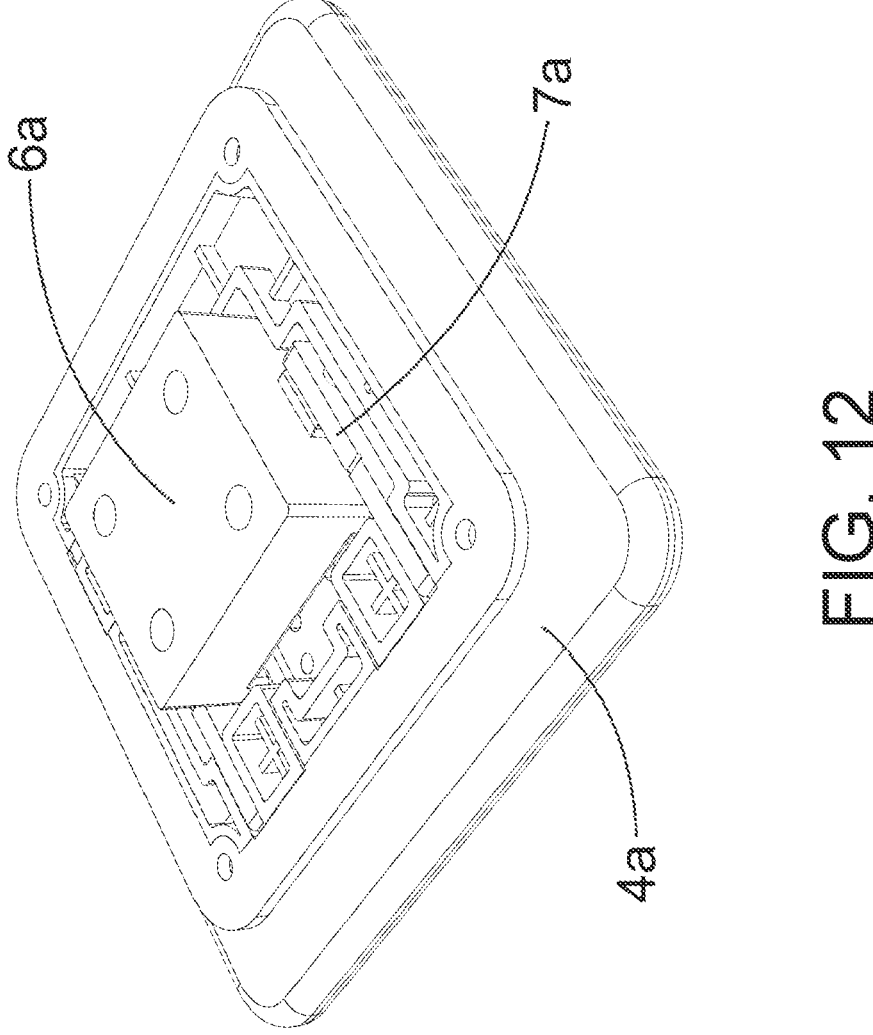
FIG. 12 illustrates a side perspective view of an example of a ground contact leg and plunger assembly according to the various embodiments described herein.
Figure 13:
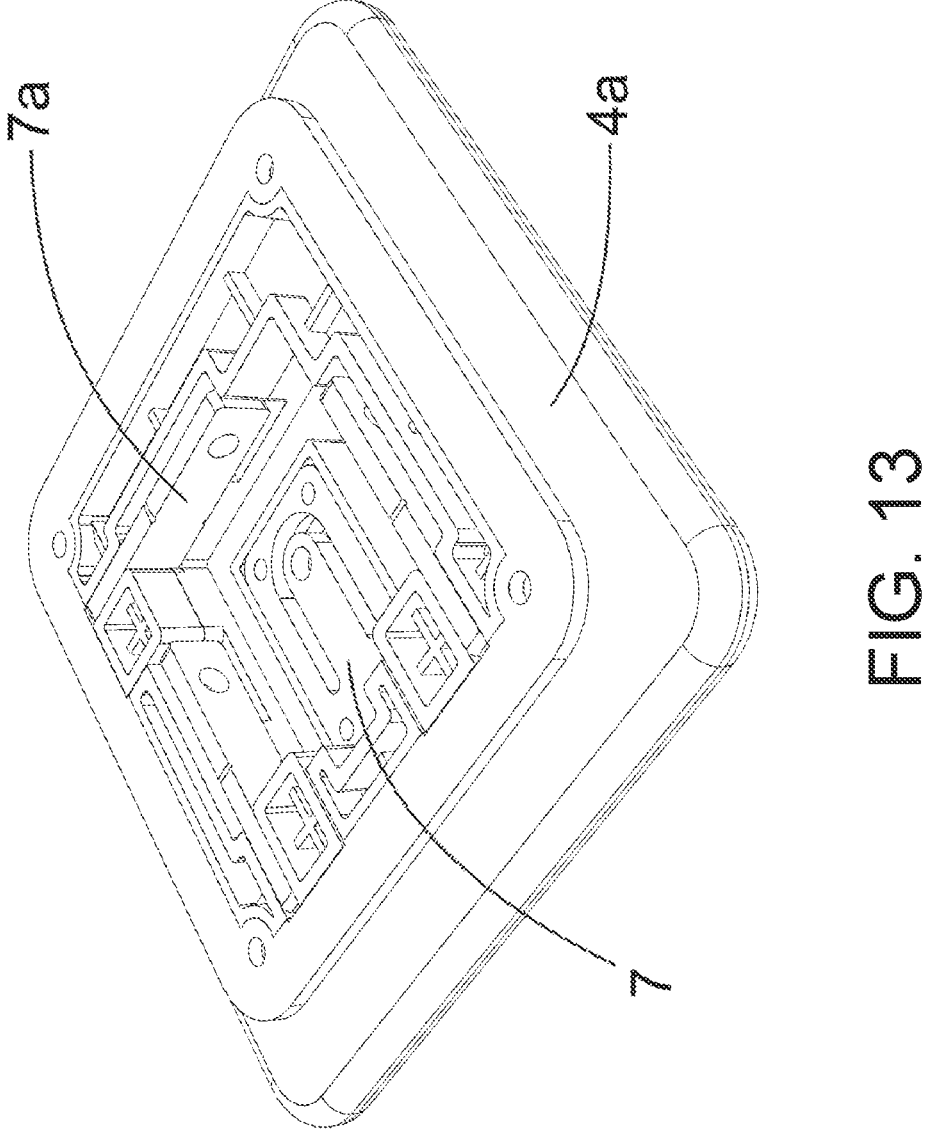
FIG. 13 depicts a side perspective view of an example of a ground contact leg with force transducers oriented on multiple orthogonal axes according to the various

FIG. 12 depicts a side perspective view of a ground contact leg 4a and plunger assembly 6a for a second embodiment of a multi-axis force-measuring assembly. The bottom surface of the ground contact leg 4a may be outfitted with rubber, foam, or another material to increase friction with the ground. Users of such a force-measuring assembly may desire to stake, clamp, or fix the ground contact legs 4a to the surface of the ground by other means to further prevent movement between the ground contact legs 4a and the ground. The upper surface of the plunger assemblies 6a is fixed to the rigid upper plate 2a (FIGS. 9 and 18) constraining the plunger assemblies 6a to move with the rigid upper plate 2a (FIGS. 9 and 18) during the application of an external force. FIG. 13 depicts the same side perspective view of a ground contact leg 4a as FIG. 12 with the omission of the plunger assembly 6a (FIGS. 10, 12, 14, 15, 16, and 18) making visible three force transducers 7a for measuring horizontal and lateral forces and one force transducer 7 for measuring vertical forces.

Figure 14:
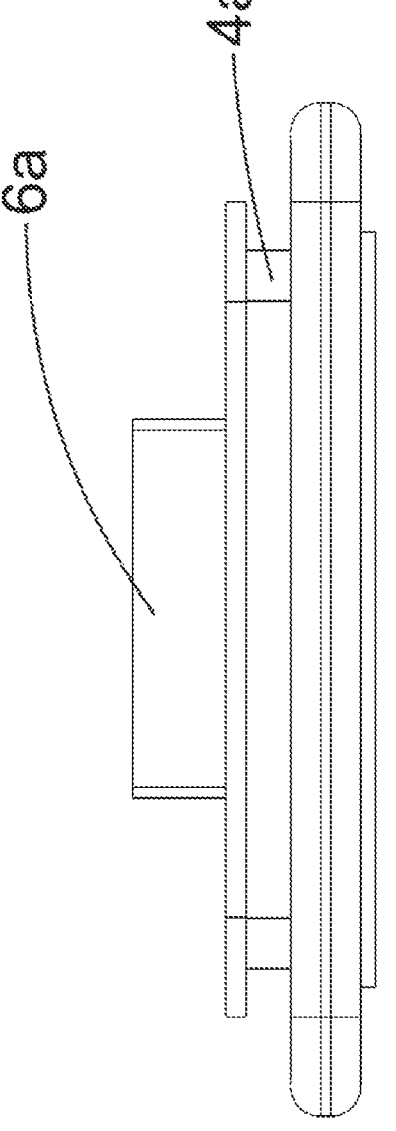
FIG. 14 depicts a side view of an example of a ground contact leg and plunger assembly according to the various embodiments described herein.
Figure 15:
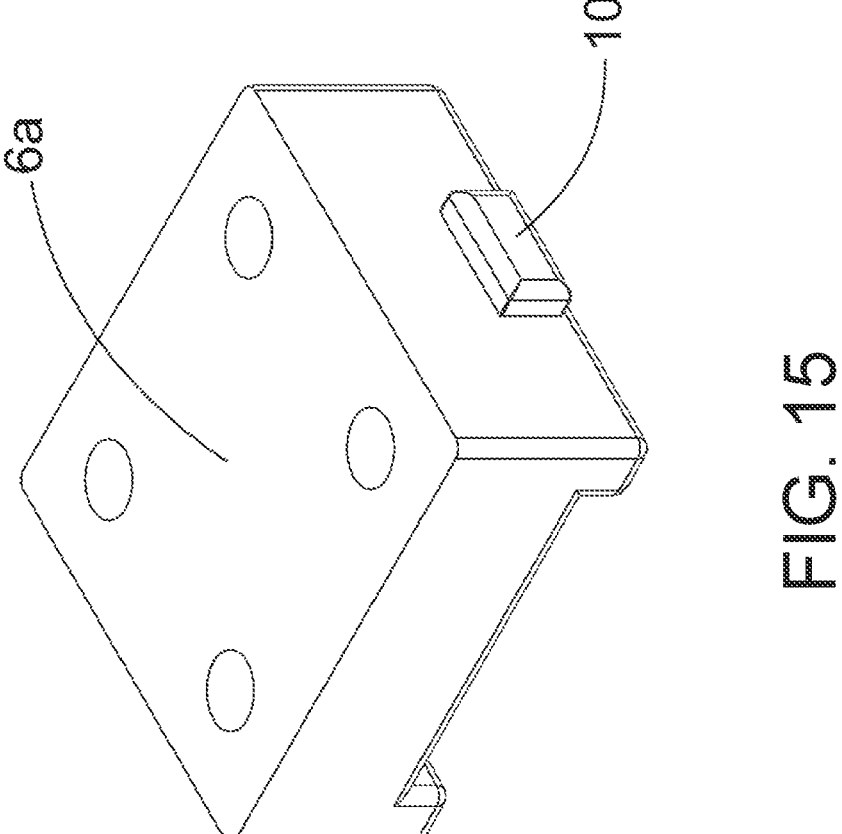
FIG. 15 depicts a side perspective view of an example of a plunger assembly according to the various embodiments described herein.
Figure 16:
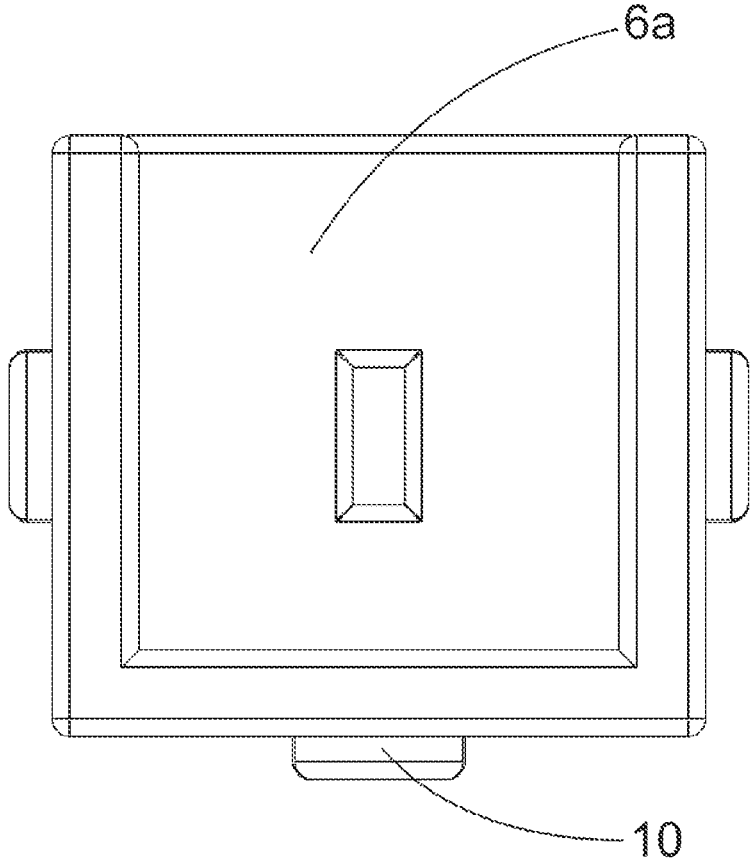
FIG. 16 displays a bottom view of an example of a plunger assembly according to the various embodiments described herein.

FIG. 14 provides a side view of an example of a ground contact leg 4a. This view displays the plunger assembly 6a and the ground contact leg 4a with a protrusion around the perimeter of the top of the ground contact leg 4a. This protrusion prevents the ground contact leg 4a from being removed from the narrower opening of the single-body ground contact leg socket 5a (FIGS. 9, 10, 17, and 18) and greater force-measuring assembly. The protrusion around the perimeter of the bottom of the ground contact leg 4a extends beyond the vertical exterior surface of the single-body ground contact leg socket 5a (FIGS. 9, 10, 17, and 18) and greater force-measuring assembly allowing the ground contact legs 4a to rest against an external object (such as a pitching rubber fixed to a mound or a wall) without restricting movement of the rigid upper plate 2a (FIGS. 9 and 18) and greater force-measuring assembly. The ground contact leg 4a rests within the single-body ground contact leg socket 5a (FIGS. 9, 10, 17, and 18) with enough room provided to move laterally relative to the single-body ground contact leg socket 5a (FIGS. 9, 10, 17, and 18) and greater force-measuring assembly. The narrower body of the ground contact leg 4a between the upper and lower protrusions provides a vertical gap between the lower protrusion of the ground contact leg 4a and the lower surface of the single-body ground contact leg socket 5a (FIGS. 9, 10, 17, and 18). The plunger assembly 6a extends vertically beyond the ground contact leg 4a providing a second vertical gap between the ground contact leg 4a and the rigid upper plate 2a (FIGS. 9 and 18). These gaps allow the ground contact leg 4a to move vertically relative to the greater force-measuring assembly. FIG. 15 depicts a side perspective view of an example plunger assembly 6a for a second embodiment of a force-measuring assembly. The bottom of the plunger assembly 6a is recessed to allow the plunger assembly 6a to rest lower within a ground contact leg 4a (FIGS. 9, 10, 12, 13, and 14) minimizing the distance between the rigid upper plate 2a (FIGS. 9 and 18) and the ground by lowering the position of the horizontal and lateral force transducers 7a (FIGS. 11,12, and 13). Protrusions from the plunger assembly 10 may be composed of a low-friction material such as but not limited to polytetrafluoroethylene (PTFE) to reduce friction. In embodiments, such protrusions 10 are positioned to interact with force transducers 7 and 7a (FIGS. 11,12, and 13) embedded within the ground contact legs 4a (FIGS. 10, 12, 13, and 14) when force is applied to the rigid upper plate 2a (FIGS. 9 and 18). FIG. 16 depicts the bottom view of a plunger assembly 6a exposing four low-friction protrusions 10 intended to interact with force transducers 7 and 7a (FIGS. 11,12, and 13).

Figure 17:
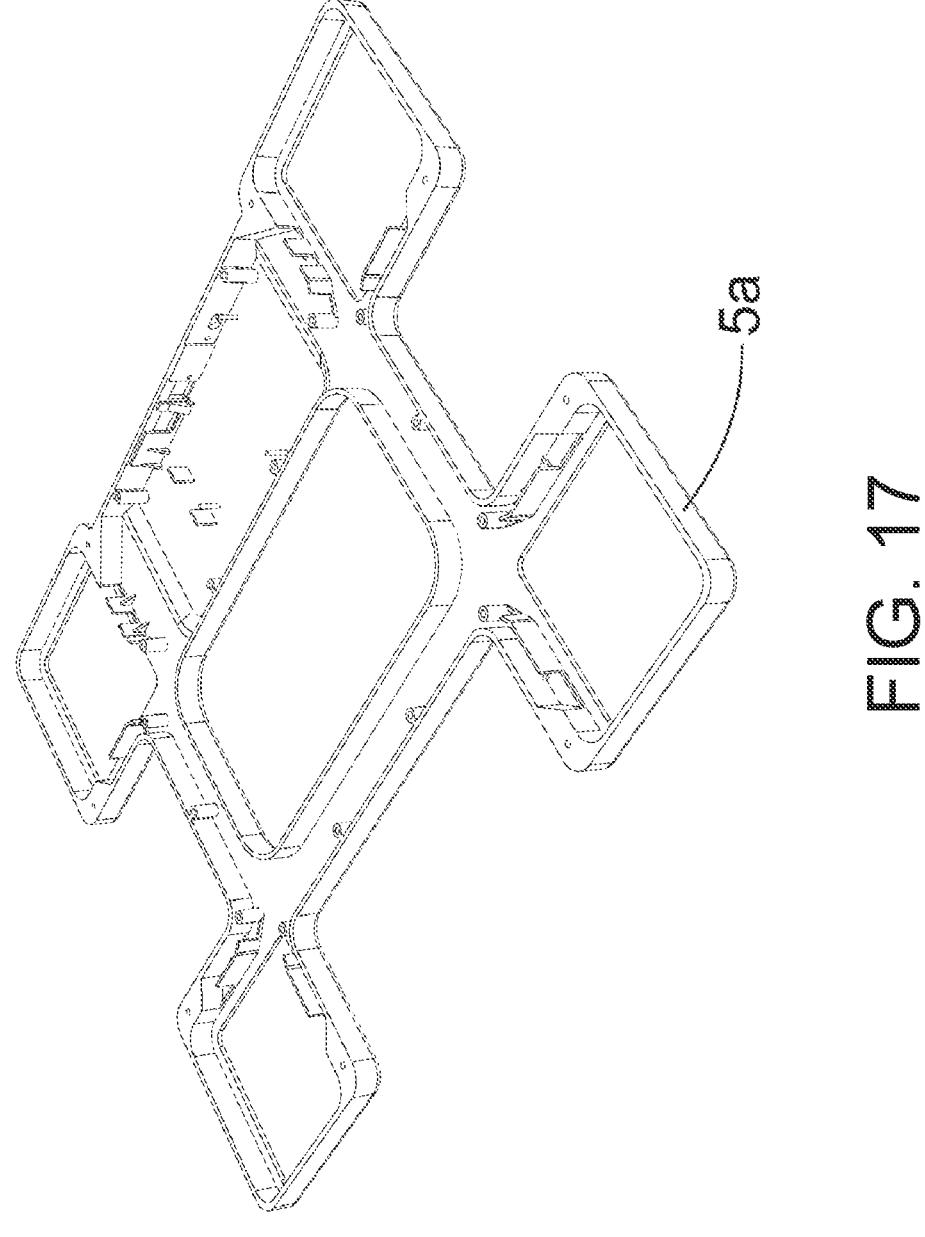
FIG. 17 illustrates a side perspective view of an example of a single-body ground contact leg socket according to the various embodiments described herein.

FIG. 17 illustrates a side perspective view of a single-body ground contact leg socket 5a intended to provide a wiring channel as previously described. The single-body ground contact leg socket 5a remains fixed to the rigid upper plate 2a (FIGS. 9 and 18) but allows movement with respect to the ground contact legs 4a (FIGS. 9, 10, 12, 13, and 14). Additionally, the single-body ground contact leg socket 5a prevents the removal of ground contact legs 4a (FIGS. 9, 10, 12, 13, and 14) from the greater force-measuring assembly without restricting relative movement between ground contact legs 4a (FIGS. 9, 10, 12, 13, and 14) and the greater force-measuring assembly within a certain tolerance. This embodiment enables a one single-body ground contact leg socket 5a to accommodate all ground contact legs 4a (FIGS. 9, 10, 12, 13, and 14).

FIG. 18 depicts a side perspective view of the underside of a second embodiment of a multi-axis force-measuring assembly with the omission of ground contact legs 4a (FIGS. 9, 10, 12, 13, and 14). This omission reveals only the components fixed to the rigid upper plate 2a: the single-body ground contact leg socket 5a and plunger assemblies 6a. A protrusion 13 toward the rear of the single-body ground contact leg socket 5a creates additional space to store electronic hardware. All components shown in FIG. 18 (rigid upper plate 2a, single-body ground contact leg socket 5a, and plunger assemblies 6a) are fixed and move together as one unit in accordance with the application of external force.

Figure 19:
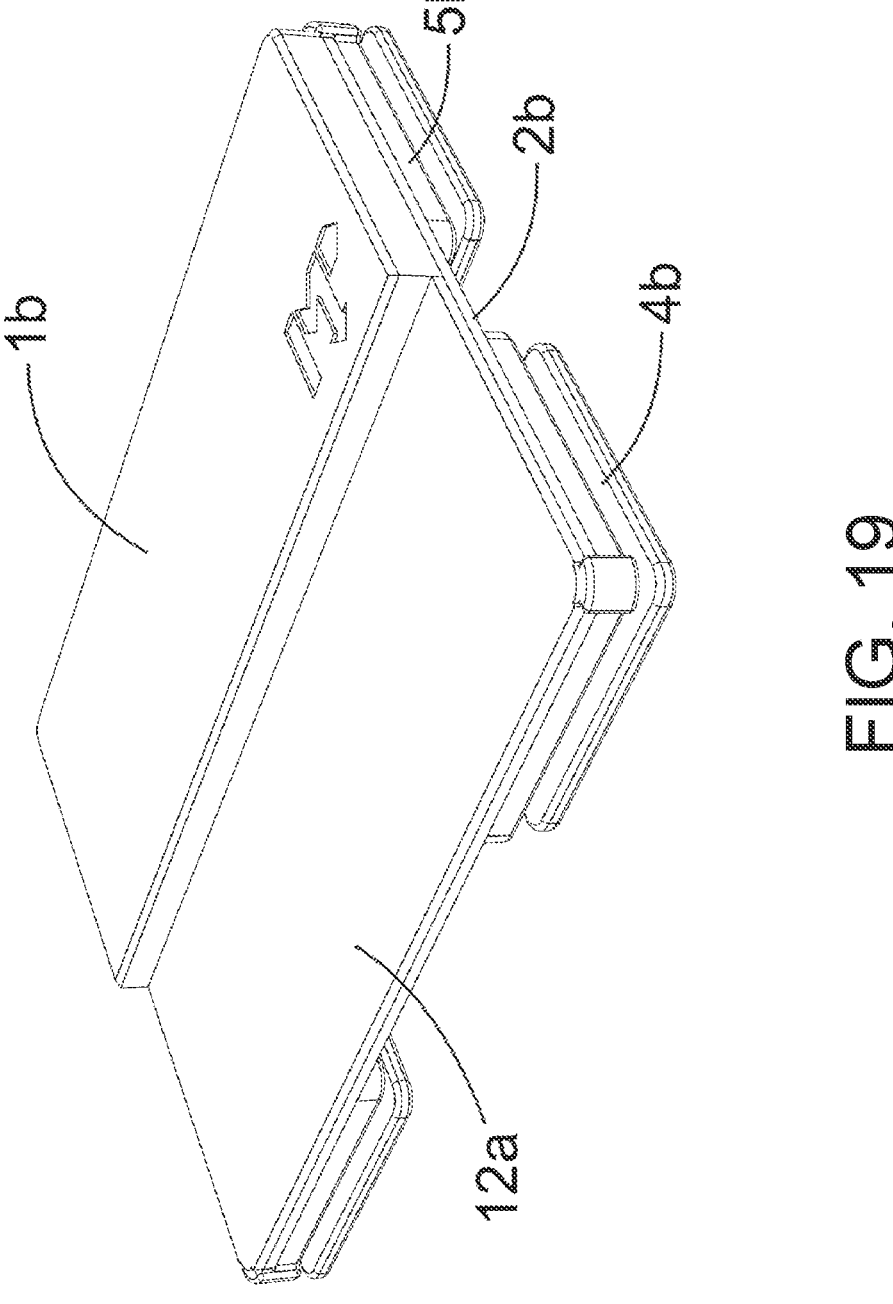
FIG. 19 illustrates a side perspective view of a third example of a multi-axis force-measuring assembly tailored for a baseball pitcher modified according to the various embodiments described herein.

FIG. 19 displays a side perspective view of a third embodiment of a multi-axis force-measuring assembly (depicted in FIG. 19-31). The embodiment, tailored to provide ground-reaction force measurements during baseball pitching, includes a pitching rubber 1b, turf 12a, rigid upper plate 2b, ground contact legs 4b, a single-body ground contact leg socket 5b and reflects several revisions. First, additional force transducers 7a (FIGS. 21, 22, 23, 24, 25, and 31) oriented in the horizontal axis were included in each ground contact leg 4b to obtain positive and negative force measurements in the horizontal direction. Second, additional force transducers 7 (FIGS. 21, 24, 25, and 31) oriented in the vertical axis were included in each ground contact leg 4*b* to increase vertical load capacity. Third, pairs of ground contact legs 4*a* (FIGS. 10, 12, 13, and 14) (front and back) were merged into single bilateral ground contact legs 4*b* to prevent unwanted rotation of individual ground contact legs 4*a* (FIGS. 10, 12, 13, and 14) that have freedom to move within a given tolerance relative to the greater force-measuring assembly. This merger prevents motion in individual ground contact legs but instead allows motion in pairs restricting individual rotation. Fourth, static fasteners 17 (FIG. 30) were added to each of four exterior corners of the single-body ground contact leg socket 5*b* to increase rigidity of the single-body ground contact leg socket 5*b* and prevent unwanted friction between the single-body ground contact leg socket 5*b* and bilateral ground contact legs 4*b* that may have occurred from drooping of the four exterior corners of the single-body ground contact leg socket 5*b*.

Figure 20:
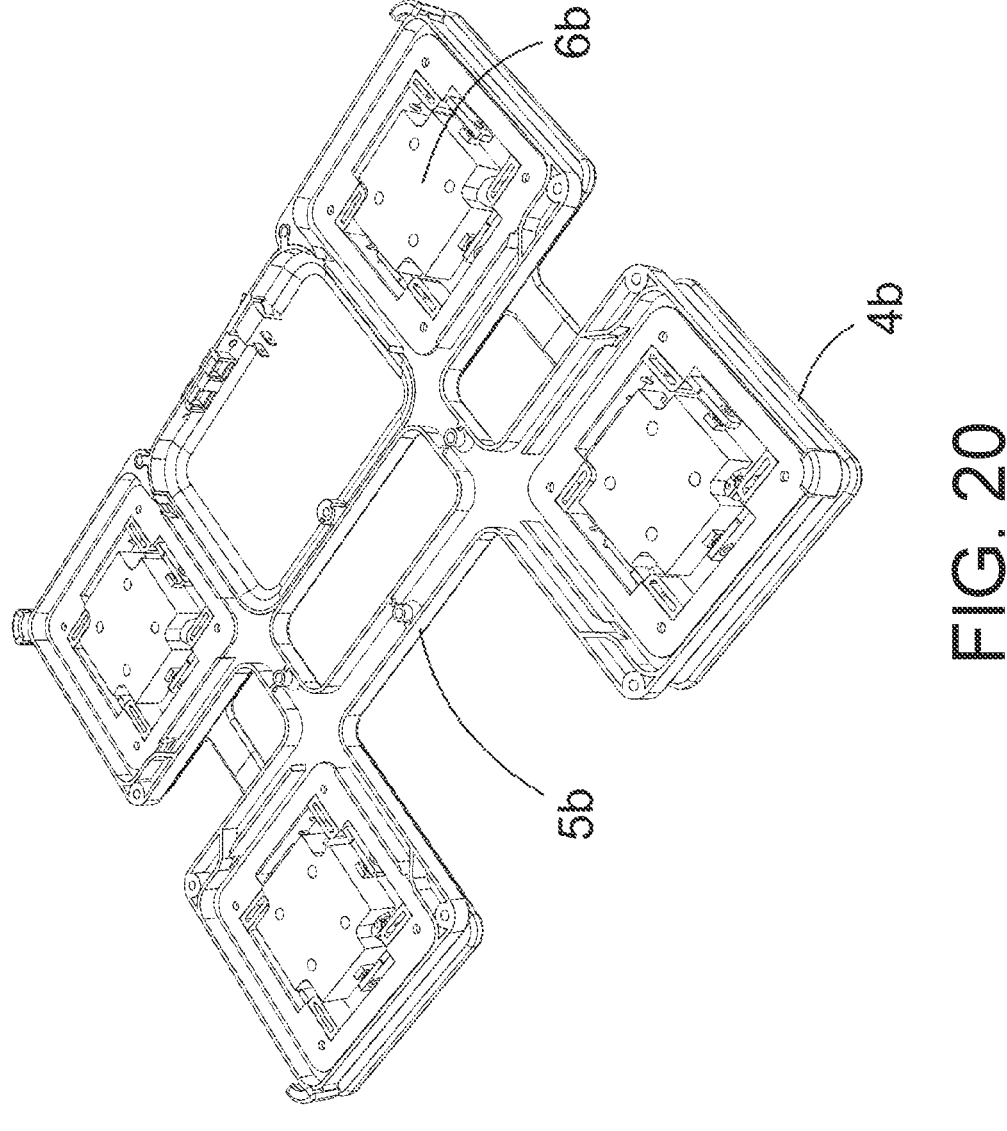
FIG. 20 depicts a side perspective view of example bilateral ground contact leg assemblies, and an example of a single-body ground contact leg socket according to the various embodiments described herein.
Figure 30:
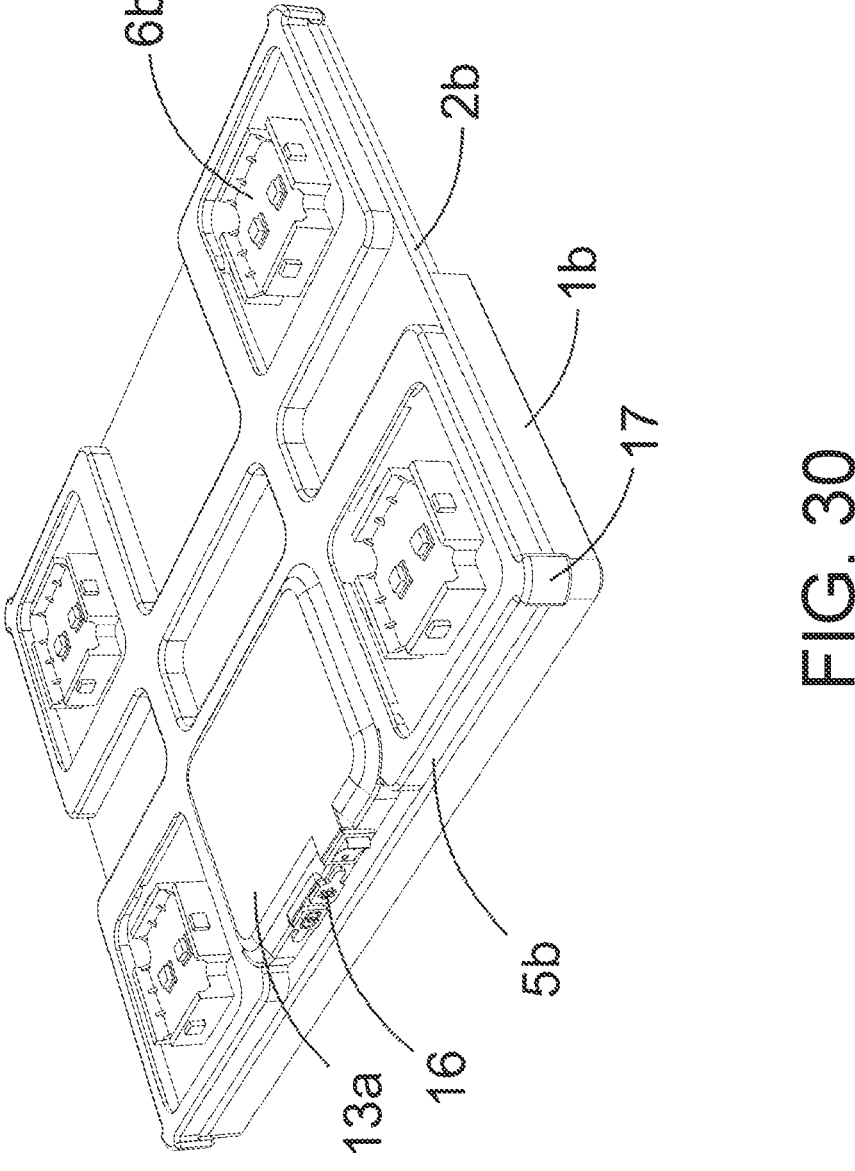
FIG. 30 depicts a side perspective view of the bottom of a third example of a multi-axis force-measuring assembly with the omission of ground contact legs according to the various embodiments described herein.
Figure 31:
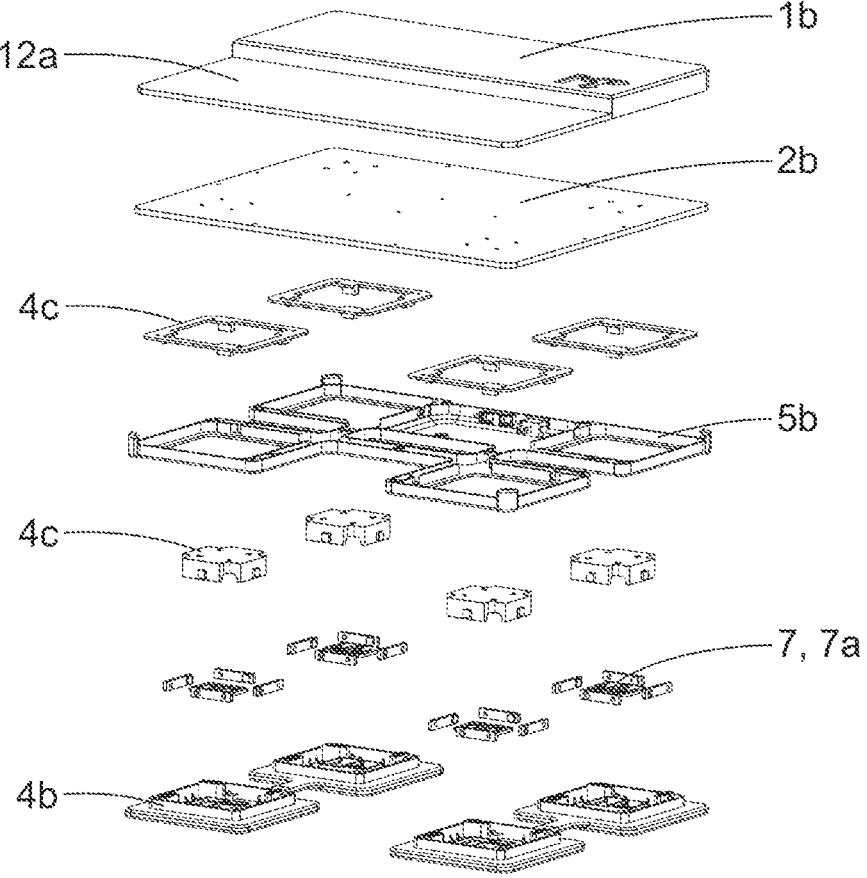
FIG. 31 illustrates an exploded side perspective view of a third example of a multi-axis force-measuring assembly tailored for a baseball pitcher according to the various embodiments described herein.

FIG. 20 illustrates a side perspective view of a third embodiment of a force-measuring assembly with the omission of a pitching rubber 1*b* (FIGS. 19 and 31), turf 12*a* (FIGS. 19 and 31), and rigid upper plate 2*b* (FIGS. 19, 30, and 31). The omission in this embodiment makes visible two bilateral ground contact legs 4*b*, four plunger assemblies 6*b*, and a single-body ground contact leg socket 5*b* that provides a channel to house wiring and embedded electrical hardware. The protrusion around the perimeters of the top of each section (front and back) of a ground contact leg 4*b* is unable to pass through the narrower opening of the single-body ground contact leg socket 5*b* preventing the removal of the bilateral ground contact legs 4*b* from the greater force-measuring assembly. However, the width of the single-body ground contact leg socket 5*b* around both the base and upper protrusion of the bilateral ground contact legs 4*b* is large enough to allow relative movement between both components in the horizontal and lateral directions within a certain tolerance. The narrower body of the ground contact leg 4*b* between the upper and lower protrusions of the ground contact leg 4*b* provides a vertical gap between the lower protrusion of the ground contact leg 4*b* and the lower surface of the single-body ground contact leg socket 5*b*. A second vertical gap exists between the upper surface of the bilateral ground contact leg 4*b* and the lower surface of the rigid upper plate 2*b* (FIGS. 19, 30, and 31). Such vertical gaps allow vertical relative movement between both components when force is applied to the rigid upper plate 2*b* (FIGS. 19, 30, and 31). Also depicted are four plunger assemblies 6*b* located within the bilateral ground contact legs 4*b*.

Figure 21:
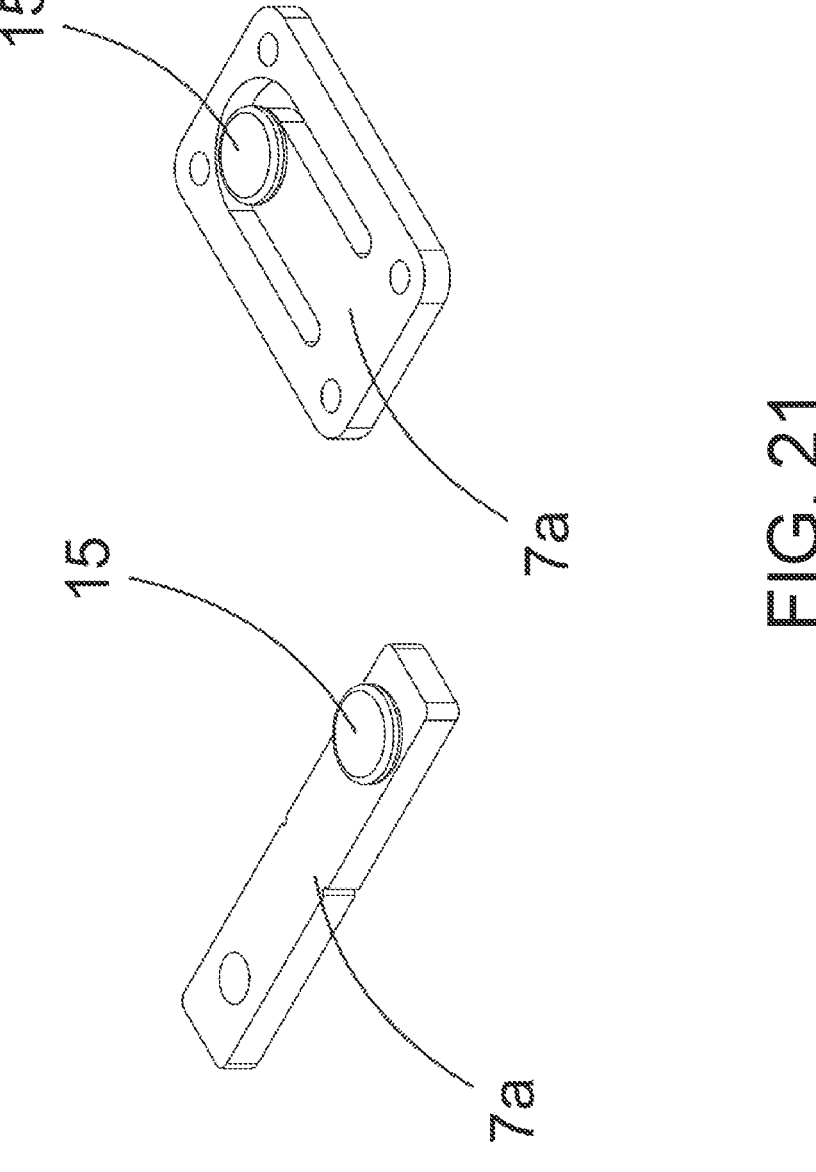
FIG. 21 displays side perspective views of two examples of force transducers which are strain gauge load cells that can be utilized according to the various embodiments described herein.

When force is applied to the rigid upper plate 2*b* (FIGS. 19, 30, and 31) corresponding force is transferred to the plunger assemblies 6*b* causing low-friction plunger protrusions 10*a* (FIGS. 26, 27, and 28) to interact with the force transducers 7 and 7*a* (FIG. 21, 22, 23, 24, 25, 31) embedded within the bilateral ground contact legs 4*b* via smooth surfaced contact areas 15 (FIG. 21) fixed to the force transducers 7 and 7*a* (FIG. 21, 22, 23, 24, 25, 31). This occurs as only the single-body ground contact leg socket 5*b* and plunger assemblies 6*b* are fixed to the rigid upper plate 2*b* (FIGS. 19, 30, and 31). The bilateral ground contact legs 4*b* maximize friction with the ground preventing movement. The bottom surface of the bilateral ground contact leg 4*b* may be outfitted with rubber, foam, or another material to increase friction with the ground. This friction prevents the bilateral ground contact legs 4*b* and corresponding force transducers 7 and 7*a* (FIG. 21, 22, 23, 24, 31) from moving relative to the ground but allows the rigid upper plate 2*b* (FIGS. 19, 30, and 31), single-body ground contact leg socket 5*b*, and plunger assemblies 6*b* to move with the application of external force. This movement allows the plunger assemblies 6*b* to interact with the force transducers 7 and 7*a* (FIG. 21, 22, 23, 24, 25, 31) to collect force measurements.

FIG. 21 displays side perspective views of two example force transducers 7 and 7*a*. The transducers 7 and 7*a* depicted are strain gauge load cells but the present invention is not limited to this type of transducer. The smaller load cells 7*a* capture side-to-side and forward-to-rear forces in the embodiment; the larger load cells 7 capture downward force in the embodiment. These load cells may vary in size, shape, and configuration to accommodate the primary direction of the ground forces and expected loads relevant to different applications and may be exchanged for other force measuring transducers. The force transducers 7 and 7*a* in this embodiment are outfitted with smooth surfaced contact areas 15 fixed to the force transducers 7 and 7*a*. These smooth surfaced contact areas 15 are achieved using rivets but are not limited to such components and may be composed of polished steel or another material intended to minimize friction with the low-friction plunger protrusions 10*a* (FIGS. 26, 27, and 28) during interaction caused by the application of force.

Figure 22:
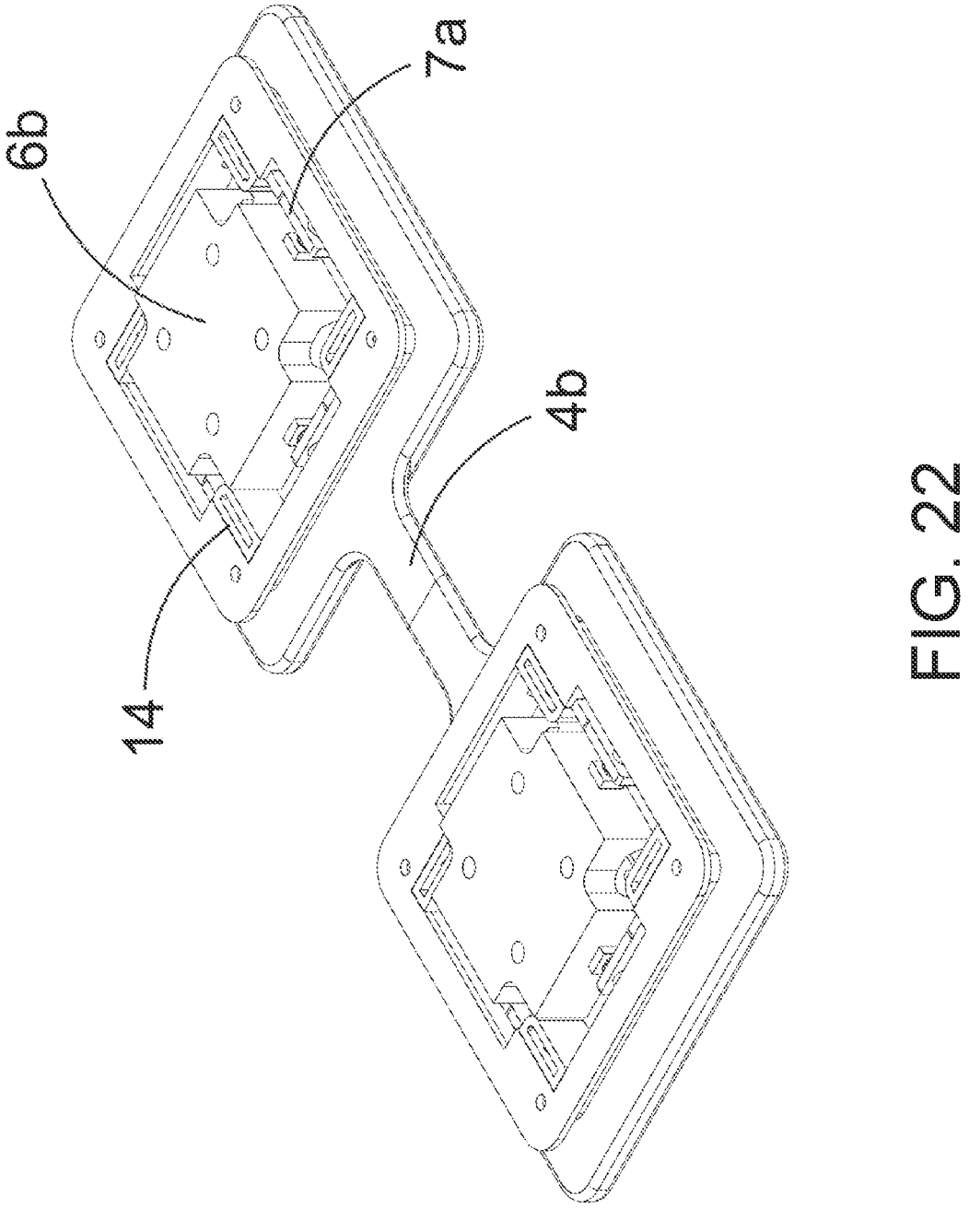
FIG. 22 illustrates a side perspective view of an example of a bilateral ground contact leg and plunger assembly according to the various embodiments described herein.
Figure 23:
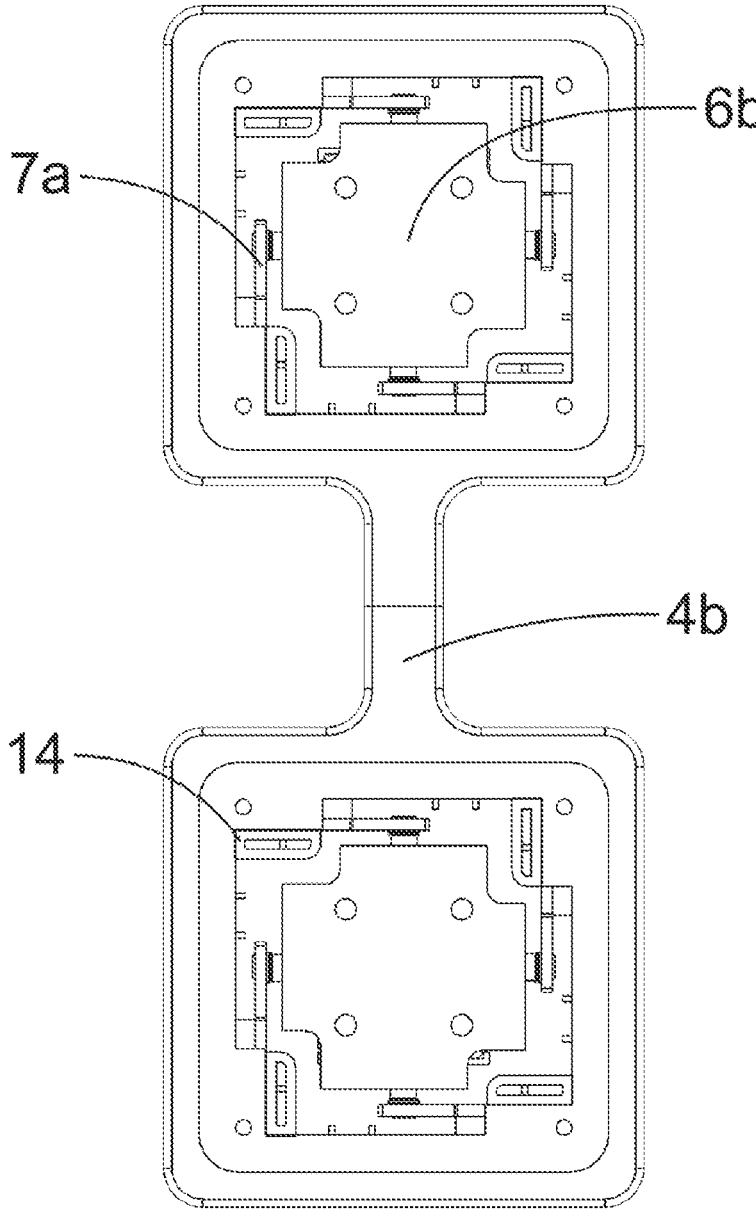
FIG. 23 illustrates a top view of an example of a bilateral ground contact leg and plunger assembly according to the various embodiments described herein.

FIG. 22 illustrates a side perspective view of an example of a bilateral ground contact leg 4*b* and corresponding plunger assemblies 6*b*. In the embodiment, four horizontal transducers 7*a* and a revised plunger assembly 6*b* are positioned at each end of a bilateral ground contact leg 4*b* to collect force measurements in all four horizontal and lateral directions (side-to-side and forward-to-rear). Protrusions 14 from the base of the ground contact leg 4*b* act to fix and maintain stability of bending beam transducers 7*a* while the opposing end of the transducers 7*a* are provided space to deflect under stress. The upper surface of the plunger assemblies 6*b* are fixed to the rigid upper plate 2*b* (FIGS. 19, 30, and 31) constraining the plunger assemblies 6*b* to move with the rigid upper plate 2*b* (FIGS. 19, 30, and 31) during the application of an external force. FIG. 23 depicts a top view of an example of a bilateral ground contact leg 4*b* and corresponding plunger assemblies 6*b*. This view makes visible eight force transducers 7*a* for measuring horizontal and lateral forces (four force transducers 7*a* in each of the front and back sections).

Figure 24:
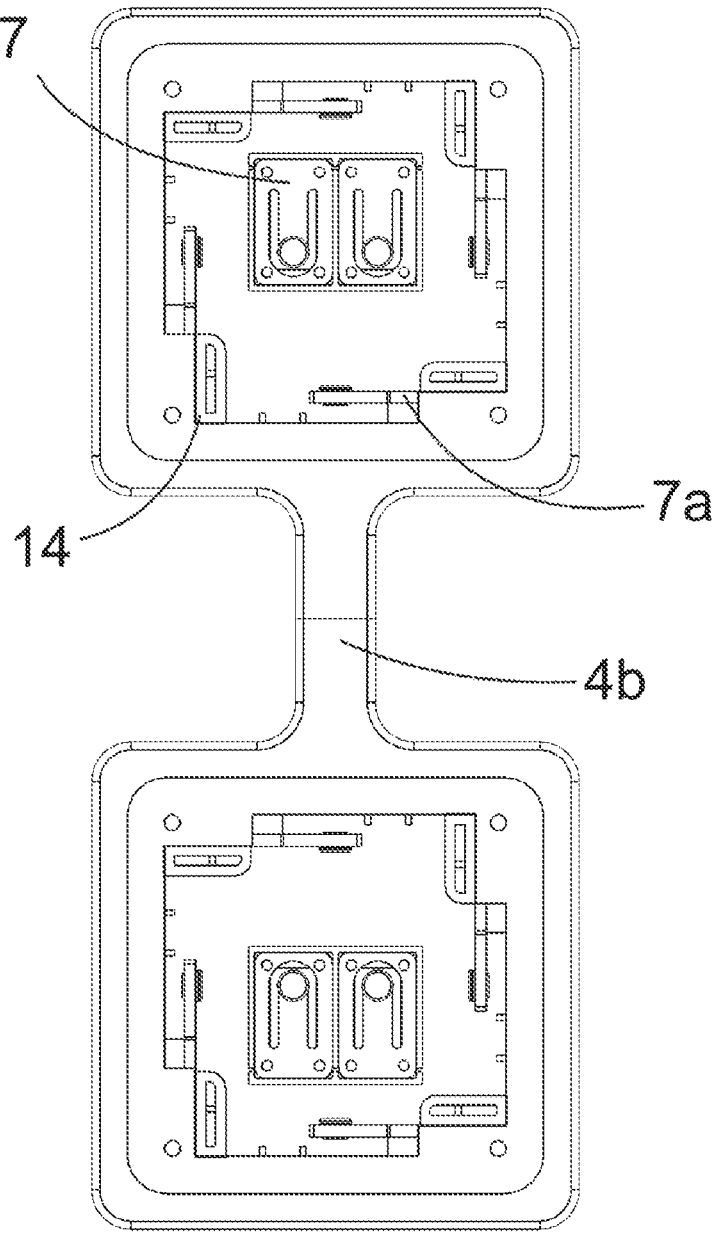
FIG. 24 depicts a top view of an example of a bilateral ground contact leg with force transducers oriented on multiple orthogonal axes according to the various embodiments described herein.

FIG. 24 displays the same top view as FIG. 23 with the omission of the plunger assemblies 6*b* (FIGS. 20, 22, 23, 25, 26, 27, 28, 30, and 31) revealing four force transducers 7 oriented to measure vertical forces. In this embodiment, two vertical force transducers 7 are used at each end (front and rear) of a bilateral ground contact leg 4*b* to increase vertical load capacity and four horizontal force transducers 7*a* are used at each end (front and rear) of a bilateral ground contact leg 4*b* to collect force measurements in four horizontal and lateral directions (side-to-side and forward-to-rear).

Figure 25:
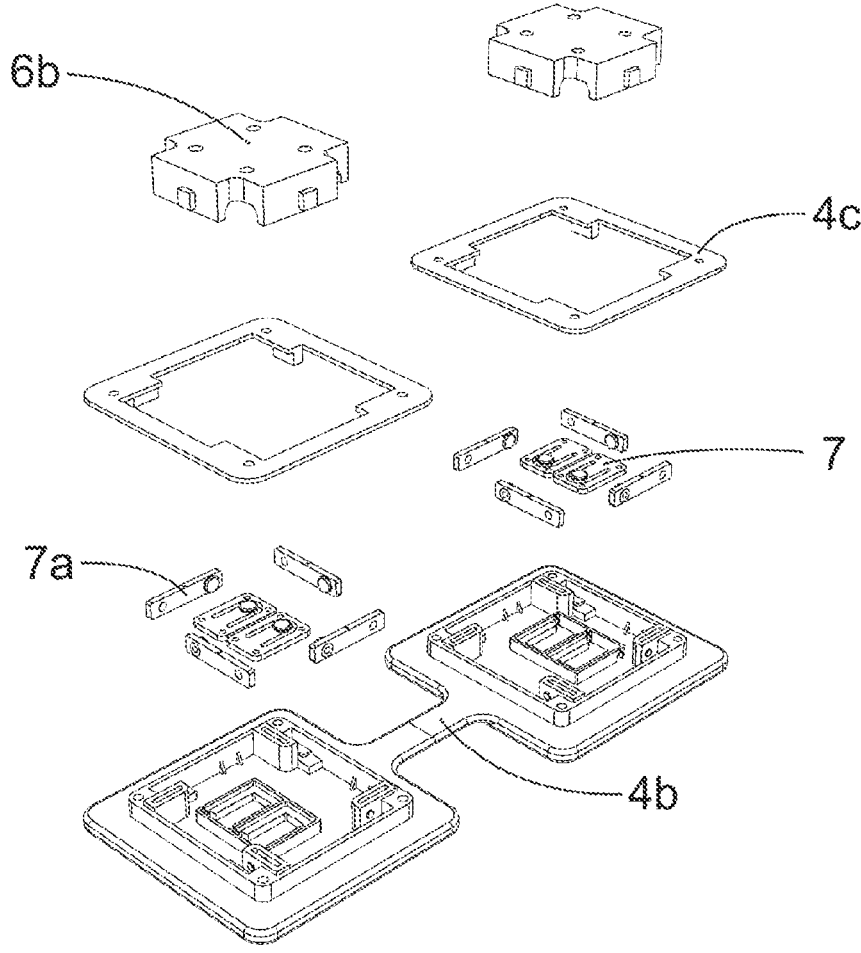
FIG. 25 displays an exploded side perspective view of a bilateral ground contact leg and plunger assembly with force transducers oriented on multiple orthogonal axes according to the various embodiments described herein.

FIG. 25 displays an exploded side perspective view of the components of a third embodiment of a multi-axis force-measuring assembly resting below but not fixed to the rigid upper plate 2*b* (FIGS. 19, 30, and 31). These include plunger assemblies 6*b*, detachable upper portions of a bilateral ground contact leg 4*c*, force transducers 7 and 7*a*, and the lower portion of a bilateral ground contact leg 4*b*. The detachable upper portion of a bilateral ground contact leg 4*c* acts to secure the force transducers 7 and 7*a* to the interior of the lower portion of a bilateral ground contact leg 4*b*. Additionally, the upper portions of a bilateral ground contact leg 4*c* extend past the upper perimeter of the lower portion of a bilateral ground contact leg 4*b* to which it attaches creating a "lip" that is unable to pass through the opening in the single-body ground contact leg socket 5*b* (FIGS. 19, 20, 29, 30, and 31). The ability to detach the upper portions of the bilateral ground contact leg 4*c* allows the bilateral ground contact leg 4*b* to be assembled around the single-body ground contact leg socket 5*b* (FIGS. 19, 20, 29, 30, and 31). After assembly, the lower portion of the bilateral ground contact leg 4*b* rests below the single-body ground contact leg socket 5*b* (FIGS. 19, 20, 29, 30, and 31) and the upper portions of the bilateral ground contact leg 4*c* rest above the single-body ground contact leg socket 5*b* (FIGS. 19, 20, 29, 30, and 31). This configuration allows movement between the two components within a certain tolerance but prevents the complete removal of the bilateral ground contact leg 4*b* from the single-body ground contact leg socket 5*b* (FIGS. 19, 20, 29, 30, and 31) and the greater force-measuring assembly.

Figure 26:
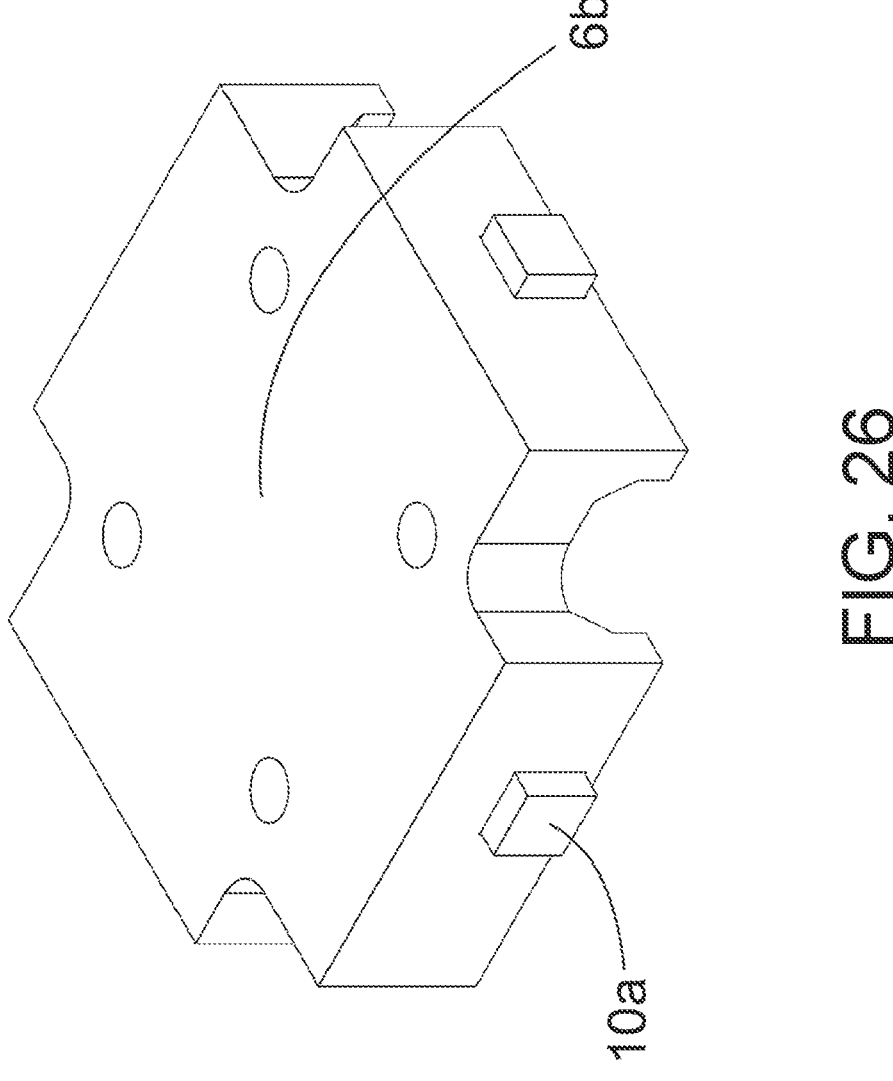
FIG. 26 depicts a side perspective view of the top of an example of a plunger assembly according to the various embodiments described herein.
Figure 27:
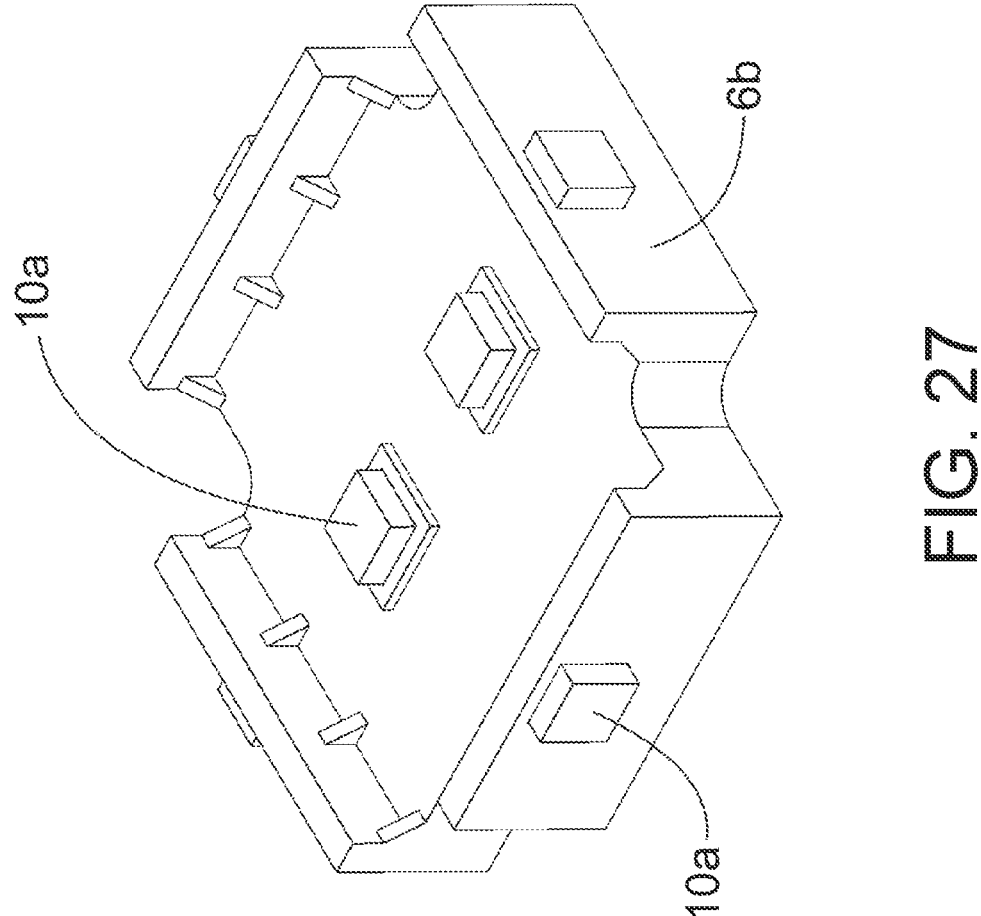
FIG. 27 depicts a side perspective view of the bottom of an example of a plunger assembly according to the various embodiments described herein.
Figure 28:
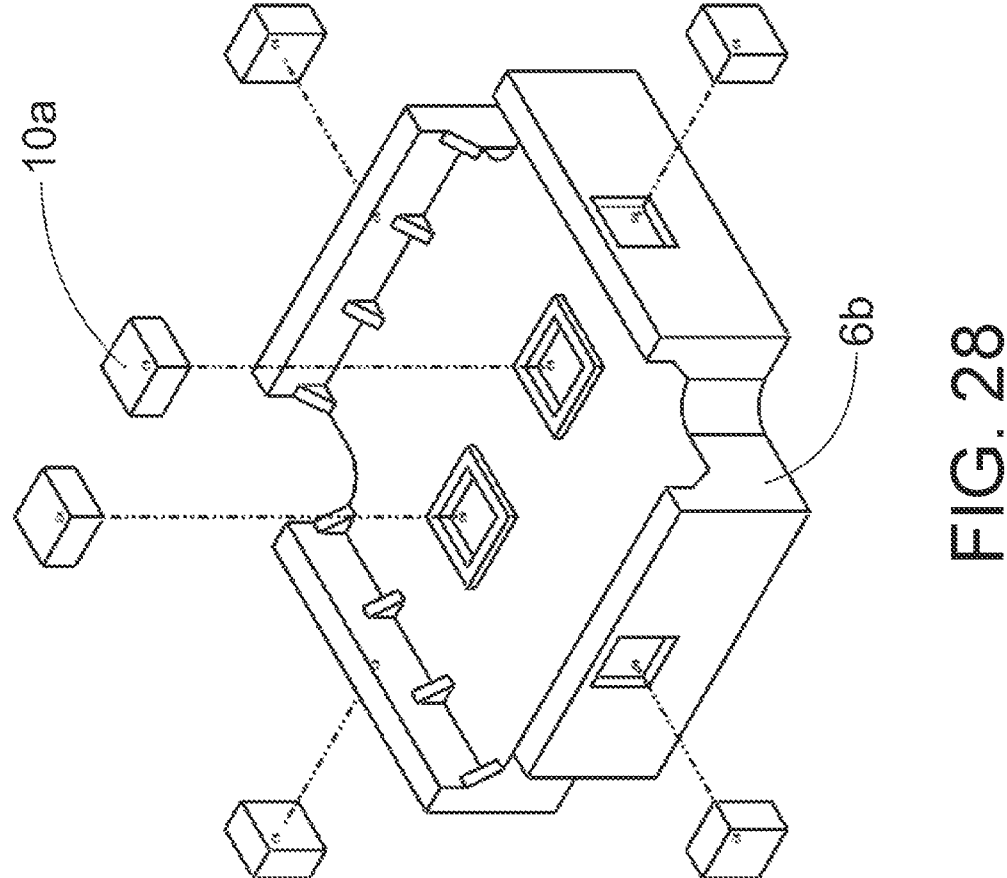
FIG. 28 depicts an exploded side perspective view of an example of a plunger assembly with low friction plunger protrusions according to the various embodiments described herein.

FIG. 26 depicts a side perspective view of an example plunger assembly 6*b* for a third embodiment of a multi-axis force-measuring assembly. The bottom of the plunger assembly 6*b* is recessed to allow the plunger assembly 6*b* to rest lower within a bilateral ground contact leg 4*b* (FIGS. 19, 20, 22, 23, 24, 25, and 31) to minimize the distance between the rigid upper plate 2*b* (FIGS. 19, 30, and 31) and the ground by lowering the position of the horizontal and lateral force transducers 7*a* (FIG. 21, 22, 23, 24, 25, 31). Protrusions from the plunger assembly 10*a* may be composed of a low-friction material such as but not limited to polytetrafluoroethylene (PTFE) to reduce friction. In embodiments, such protrusions 10*a* are positioned to interact with force transducers 7 and 7*a* (FIG. 21, 22, 23, 24, 25, 31) embedded within the bilateral ground contact legs 4*b* (FIGS. 19, 20, 22, 23, 24, 25, and 31) when force is applied to the rigid upper plate 2*b* (FIGS. 19, 30, and 31). FIG. 27 depicts the bottom view of a plunger assembly 6*b* exposing all six low-friction plunger protrusions 10*a* that interact with force transducers 7 and 7*a* (FIG. 21, 22, 23, 24, 25, 31). FIG. 28 illustrates the exploded side perspective view of a plunger assembly revealing cavities that the low-friction protrusions 10*a* partially rest inside and are fixed within.

Figure 29:
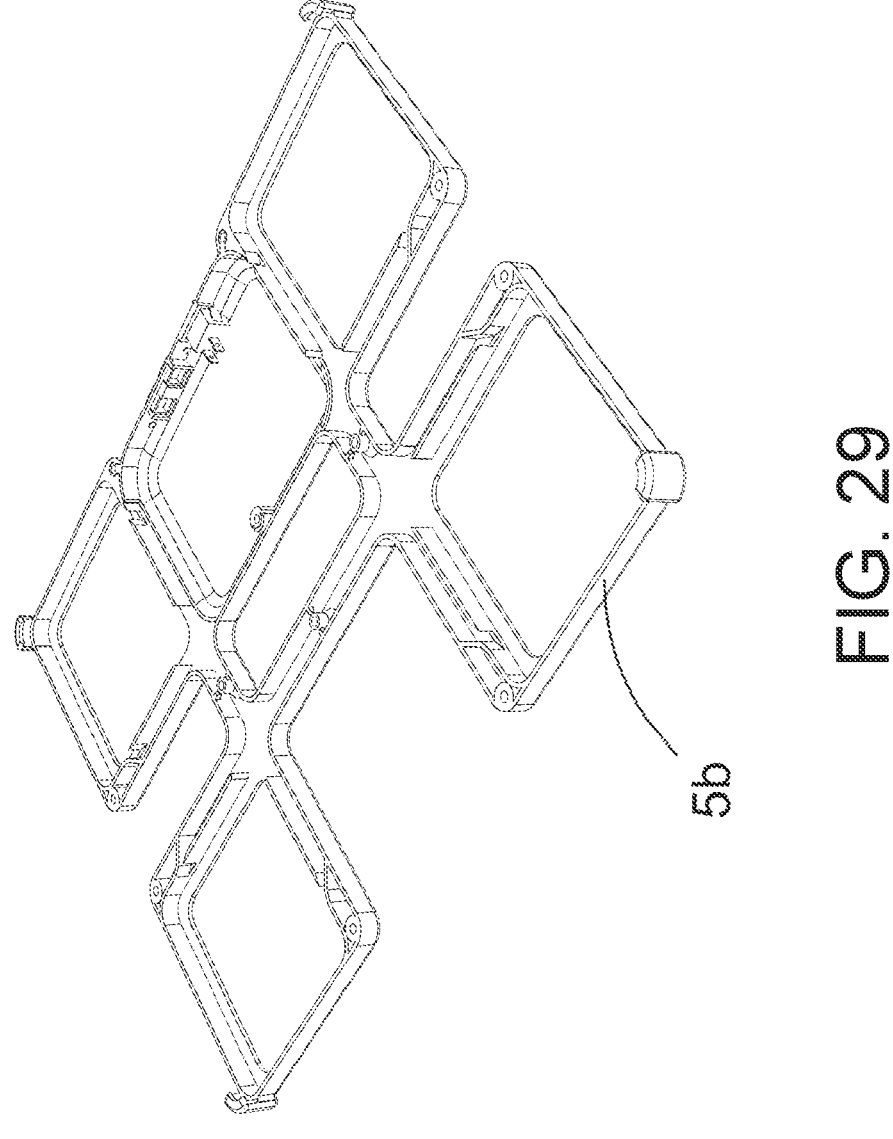
FIG. 29 illustrates a side perspective view of an example of a single-body ground contact leg socket according to the various embodiments described herein.

FIG. 29 displays a single-body ground contact leg socket 5*b* for a third embodiment of a multi-axis force-measuring assembly using a side perspective view. The single-body ground contact leg socket may provide wiring channels, power supply and data access ports, and house the embodiment's power switch. The single-body ground contact leg socket 5*b* remains fixed to the rigid upper plate 2*b* (FIGS. 19, 30, and 31) but allows movement with respect to the bilateral ground contact legs 4*b* (FIGS. 19, 20, 22, 23, 24, 25, and 31).

Additionally, the single-body ground contact leg socket 5*b* prevents the removal of bilateral ground contact legs 4*b* (FIGS. 19, 20, 22, 23, 24, 25, and 31) from the greater force-measuring assembly without restricting relative movement between bilateral ground contact legs 4*b* (FIGS. 19, 20, 22, 23, 24, 25, and 31) and the greater force-measuring assembly within a certain tolerance. This embodiment enables a single-body ground contact leg socket 5*b* to accommodate both bilateral ground contact legs 4*b* (FIGS. 19, 20, 22, 23, 24, 25, and 31).

FIG. 30 displays a side perspective view of the underside of an embodiment of a multi-axis force-measuring assembly with the omission of bilateral ground contact legs 4*b* (FIGS. 19, 20, 22, 23, 24, 25, and 31). This omission reveals only the components fixed to the rigid upper plate 2*b*: the single-body ground contact leg socket 5*b*, plunger assemblies 6*b*, and corresponding subcomponents. A protrusion 13*a* located on the single-body ground contact leg socket 5*a* creates additional space to store electronic hardware. The exterior wall of this protrusion may house power supply and data access ports 16 as well as the embodiments power switch. Additionally, the view displays static fasteners 17 intended to fix the single-body ground contact leg socket 5*a* to the underside of the rigid upper plate 2*a* and prevent the four exterior corners of the single-body ground contact leg socket 5*a* from drooping. All components shown in FIG. 30 (including the rigid upper plate 2*b*, single-body ground contact leg socket 5*a*, plunger assemblies 6*a*, and their corresponding subcomponents) are fixed and move together as one unit in accordance with the application of external force.

FIG. 31 depicts an exploded side perspective view of a third embodiment of a multi-axis force-measuring assembly. The user is intended to stand on either or both the pitching rubber 1*b* and turf 12*a* which may be fixed directly to the top surface of the rigid upper plate 2*b*. Components fixed to the underside of the rigid surface plate 2*b* include the plunger assemblies 6*b* and the single-body ground contact leg socket 5*b*. Force transducers 7 and 7*a* are housed in the lower portion of the bilateral ground contact legs 4*b*. The upper portions of the bilateral ground contact legs 4*c* are fixed to the lower portion of the bilateral ground contact legs 4*b* during assembly to stabilize the orthogonally oriented force transducers 7*a* and to prevent the removal of the bilateral ground contact legs 4*b* from the single-body ground contact leg socket 5*b* without restricting relative movement between the bilateral ground contact legs 4*b* and the greater force-measuring assembly within a certain tolerance. During use, including during this movement, the low-friction plunger protrusions 10*a* (FIGS. 26, 27, and 28) are intended to maintain contact with force transducers 7 and 7*a* via the attached smooth surfaced contact areas 15 (FIG. 21) for continuous force measurement.

Figure 32:
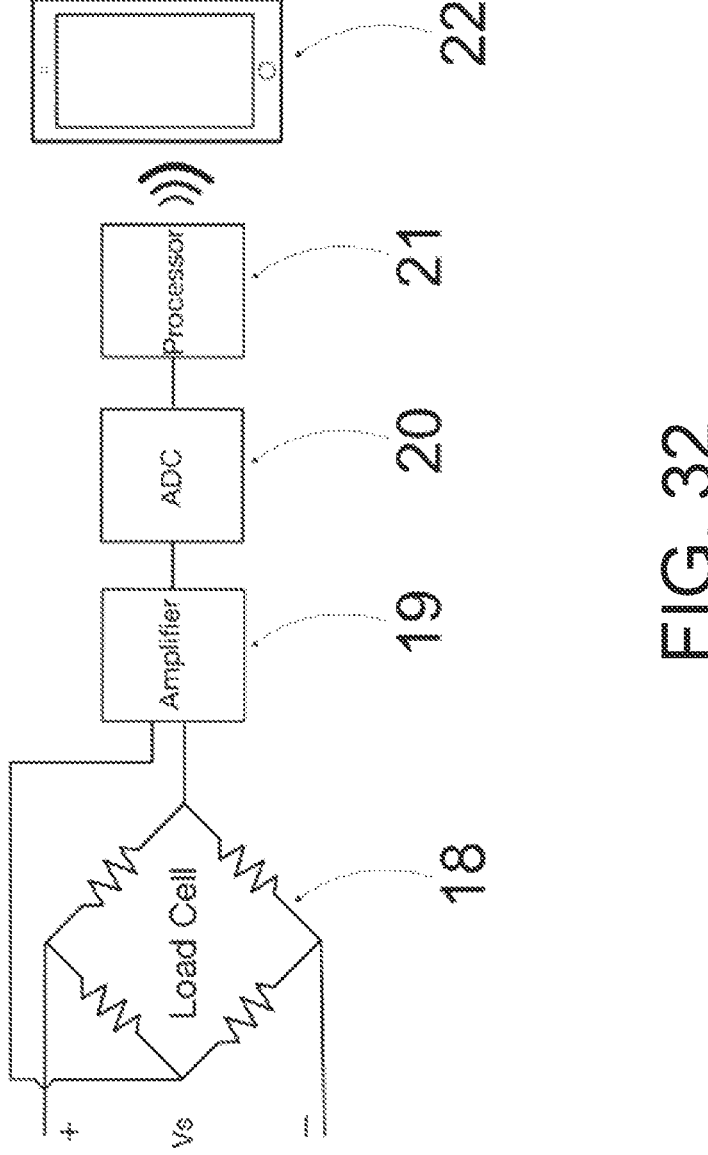
FIG. 32 illustrates an example of an electrical block diagram for collecting and displaying force measurements and calculations according to the various embodiments described herein.

FIG. 32 depicts an example electrical block diagram including one or more strain gauge load cells. Strain gauge load cells are used in the described embodiments; however, the present invention is not limited to this type of force transducer. Strain gauge load cells may be used as variable resistors within a Wheatstone Bridge 18. One or more load cells oriented to measure the same directional force can be included in such a Wheatstone Bridge 18. Typically, in embodiments, at a minimum, four vertical load cells are wired as individual Wheatstone Bridges 18 to compensate for corner effects and to provide the ability to locate a user's center of pressure (COP) using standard COP locating methods. An excitation voltage is provided to the Wheatstone Bridge 18 and the output is amplified via an amplifier 19 before being converted to a digital signal via an Analog-Digital Converter (ADC) 20. A processor 21 then interprets this digital signal and wirelessly, or via a wire, transmits the data to an external mobile device 22, computer, or another screen or method of display. The individual measurement of like (e.g., having a parallel vector component) horizontal forces allows for the calculation of applied torque. This torque is calculated using the difference of force measurements in similarly oriented transducers and calculating the trigonometric force components. Then, the force component is multiplied by the distance from the center of the force-measuring assembly to the corresponding force transducers to obtain a value of force multiplied by distance (unit of torque).

Figure 33:
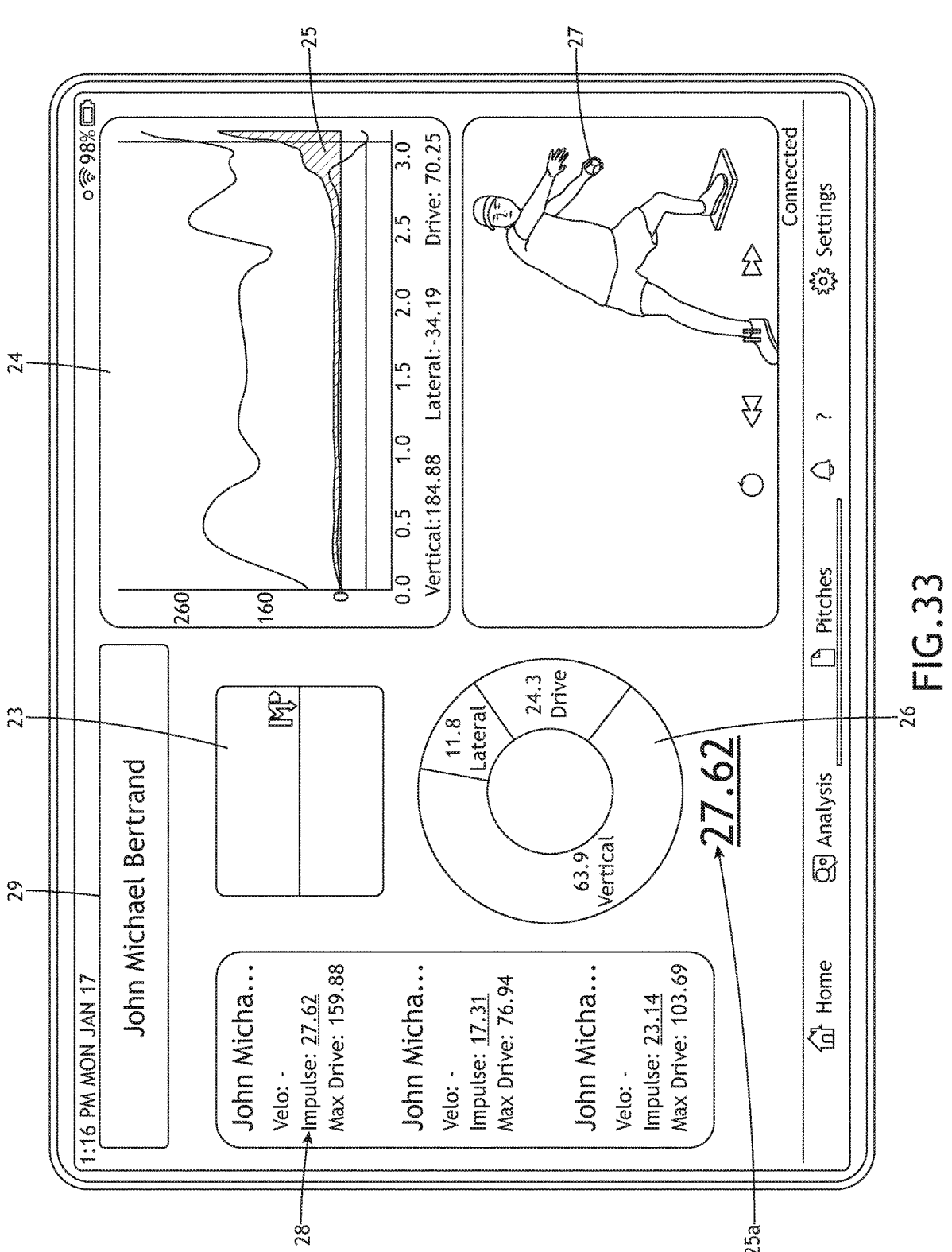
FIG. 33 is an example of a mobile application analytics dashboard for receiving, displaying, and analyzing forces and calculations according to the various embodiments described herein.

FIG. 33 presents an example of a companion mobile application analytics dashboard. The analytics dashboard may be tailorable and offer alternative modes for various activities, sports, and applications including the capability of indicating goal achievement with visual or audible alerts. The application may display a user's center of pressure 23 overlaid with a view of an embodiment of a force-measuring assembly. A second section of the display 24 may depict single or multi-axis force data over time. Within this display, impulse 25 (the integral of force) may be portrayed as a shaded region under a specific force curve. Due to the importance of impulse in this embodiment's application (baseball pitching), the numeric value of impulse is displayed separately 25*a*. Additional displays may portray data in different forms. This companion mobile application displays the contribution of each orthogonally oriented force relative to the gross force (magnitude of all forces summed using vector addition) in the form of a percentage in a pie chart 26 depicting force distribution for a specific force collection timestamp. Video 27 and data synchronization may be displayed in real time to enable correlation of user movements with resultant single or multi-axis forces. Historical data 28 may be displayed as a reference for establishing trends and tracking progress in achieving identified goals by individual users whose name or identification information 29 may be displayed on the application. This example is not intended to be limiting as the companion mobile application may be tailored to convert raw force data and display useful information in various forms based on the preferences of the user.

Algorithms and calculations, either embedded on the force-measuring assembly or within an external application, may be applied to the collected force data to provide quantitative information and opportunities to gain insights. The present methods for achieving such calculations are as follows: Impulse may be calculated automatically using coded software by determining the slope of the tangent line of a force (in correspondence to its surrounding timestamps) and comparing it to a predetermined constant starting impulse slope. If any given instantaneous slope (of the force) is greater than the predetermined constant starting impulse slope, then that timestamp may be marked as the beginning of the impulse region. The end of the impulse region may be defined by the last captured timestamp before an activity concludes. The impulse may then be calculated as the right Riemann sum of the force data throughout the impulse region. The gross vectors may be calculated at each data point on the graph (which is constituted by three forces: vertical, horizontal, and lateral). The gross vector may be calculated (using vector addition) as the square root of the summation of the squared force values (vertical, horizontal, and lateral). The percentages of each orthogonally oriented force's contribution to any given gross vector may be calculated as the absolute value of the force divided by the summation of the absolute values of all three forces-all of which may be multiplied by one hundred to convert to proper percentage notation. The angles between any two orthogonally oriented force vectors may be calculated for any given point on the graph. Angles may be calculated using trigonometric functions (with sensitivity to quadrant location of the result) between two or more orthogonal forces.

Algorithms may be used to compensate for potential error in force measurement caused by non-idealities such as but not limited to friction between transducer contact surface areas and plunger protrusion contact points and contact point variation caused by bending beam deflection and movement of plunger protrusion contact points relative to transducer contact surface areas. These algorithms may compare directional forces and use best-fit curves for bending beam deflection to identify contact point variation and compensate for such variations using software.

Collected force data may be automatically synchronized with video from the companion application to enable frame-by-frame analysis of an activity. Video and data synchronization may be achieved by coded software intended to approximate the closest data timestamp to a video frame. This approximation may be determined using hardcoded values for approximating wired or wireless latency, using machine learning, image processing, and markerless motion analysis to determine when an activity has occurred, or by using another method for approximation. Data capture may be initiated for the duration of an activity after a specified directional (vertical, horizontal, or lateral) force exceeds a preset threshold. In the described embodiment for baseball pitching, a vertical force may initiate data capture as a measured increase in vertical force may indicate a user has stepped on the force-measuring assembly and started the pitching process. The last data point to capture may be determined by a specified directional (vertical, horizontal, or lateral) dropping below a predetermined threshold value indicating an activity has been completed. In the described embodiment for baseball pitching, a measured vertical force dropping below a preset threshold may indicate a user has stepped off the force-measuring assembly and any further data may not be valuable.

Captured data may be automatically cropped to enable analysis of significant data while omitting extraneous data. Steps for collecting data for the described embodiments using baseball pitching as an example activity may include, but are not limited to: 1) place the force-collecting assembly on a relatively level surface ensuring only the ground contact legs are in contact with the ground and/or surrounding stationary objects, 2) connect the force-measuring assembly to the companion application, a mobile device, computer, or other peripheral via a wired or wireless connection, 3) power on the device and allow ample time for the device to tare (zero-out), 4) step on the upper surface of the assembly; this may activate data collection using the methods previously described, 5) complete an activity (in the embodiment, pitch a baseball); data will be transmitted to the application, 6) view the force data and any additional calculations corresponding to the completed activity using the companion application.

The methods and assemblies herein are illustrated through direct reference to variations of embodiments. These variations are representative of the methods and assemblies detailed above but are not exclusive. Equivalent embodiments that apply comparable methods or perform similar functions are considered within the scope of the present invention.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

The invention claimed is:

1. A force measurement system comprising:
   a base portion including:
      at least one cavity defining a first planar surface and a second planar surface orthogonal to the first planar surface;
   an upper portion including:
      a plate:
      at least one plunger assembly operably coupled to an underside of the plate; and
      at least one pitching rubber operably coupled to a top side of the plate; a first transducer, configured to convert a mechanical force to one or more electrical signals, disposed on the first planar surface; and
   a second transducer, configured to convert a mechanical force to one or more electrical signals, disposed on the second planar surface;
   wherein the at least one plunger assembly is receivable within the at least one cavity,
   wherein the first transducer is disposed between the at least one plunger assembly and the first planar surface of the at least one cavity when the at least one plunger assembly is received within the at least one cavity, wherein the second transducer is disposed between the at least one plunger assembly and the second surface of the at least one cavity when the at least one plunger assembly is received within the at least one cavity, and wherein the at least one plunger assembly is configured to translate a force to at least one of the first transducer or the second transducer upon an application of force to the upper portion.

2. The force measurement system of claim 1,
wherein the first planar surface includes:
  a first vertical surface, and
wherein the second planar surface orthogonal to the first planar surface includes:
  a second vertical surface.

3. The force measurement system of claim 1,
wherein the first planar surface includes:
  a vertical surface, and
wherein the second planar surface orthogonal to the first planar surface includes:
  a horizontal surface.

4. The force measurement system of claim 1, wherein the at least one cavity includes:
a third planar surface parallel to at least one of the first planar surface or the second planar surface,
wherein the force measurement system further comprises:
  a third transducer, and
  wherein the third transducer is disposed between the at least one plunger assembly and the third planar surface of the at least one cavity when the at least one plunger assembly is received within the at least one cavity.

5. The force measurement system of claim 1, wherein the at least one plunger assembly includes:
  a plunger body portion; and
  at least one protrusion extending from a surface of the plunger body portion,
wherein the at least one protrusion is configured to contact the at least one of the first transducer or the second transducer when the at least one plunger assembly is received within the at least one cavity.

6. The force measurement system of claim 5, wherein the at least
one plunger assembly includes:
a low-friction material.

7. The force measurement system of claim 6, wherein the low-friction material includes:
polytetrafluoroethylene (PTFE).

8. The force measurement system of claim 1, wherein at least one of the first transducer or the second transducer includes:
  at least one strain gauge load cell.

9. The force measurement system of claim 1, wherein at least one of the first transducer or the second transducer includes:
  two or more strain gauge load cells configured as a Wheatstone bridge.

10. The force measurement system of claim 1, further comprising:
  at least one processor device configured to receive one or more signals from at least one of the first transducer or the second transducer.

11. The force measurement system of claim 10, further comprising:
  at least one display device configured to receive one or more signals from the at least one processor device.

12. The force measurement system of claim 10, further comprising:

at least one wireless transmitter configured to receive one or more signals from the at least one processor device and transmit one or more signals to a wireless device.

13. The force measurement system of claim 10, further comprising:
  at least one memory device including one or more instructions to configure the at least one processor device for:
    computing a difference in force measurements from two or more similarly oriented transducers; and
    calculating one or more trigonometric force components from the difference in measurements.

14. The force measurement system of claim 13, wherein the two or more similarly oriented transducers include: two or more parallel oriented transducers.

15. A force measurement system claim 1, comprising:
a base portion including:
  at least one cavity defining at least one surface; and
  at least one ground contact leg having a perimeter protrusion;
an upper portion including:
  at least one plunger assembly operably coupled to a plate; and
at least one transducer;
wherein the upper portion further comprises at least one socket wider than a width of the at least one ground contact leg but narrower than the perimeter protrusion, and
wherein, upon insertion of the at least one ground contact leg into the at least one socket, the at least one socket remains moveable relative to the at least one ground contact leg in one or more horizontal directions upon application of force to the upper portion,
wherein the at least one plunger assembly is receivable within the at least one cavity,
wherein the at least one transducer is disposed between the at least one plunger assembly and the at least one surface of the at least one cavity when the at least one plunger assembly is received within the at least one cavity, and
wherein the at least one plunger assembly is configured to translate a force to the at least one transducer upon an application of force to the upper portion.

16. The force measurement system of claim 15, further comprising:
at least one processor device configured to receive one or more signals from the at least one transducer.

17. The force measurement system of claim 16, further comprising:
at least one display device configured to receive one or more signals from the at least one processor device.

18. The force measurement system of claim 16, further comprising:
at least one wireless transmitter configured to receive one or more signals from the at least one processor device and transmit one or more signals to a wireless device.

19. A user force-application measurement system comprising:
a base portion including:
  at least one plunger assembly;
an upper portion including:
  a pitching rubber:
  at least one cavity defining a first planar surface and a second planar surface orthogonal to the first planar surface;
a first transducer, configured to convert a mechanical force to one or more electrical signals, disposed on the first planar surface; and a second transducer, configured to convert a mechanical force to one or more electrical signals, disposed on the second planar surface;

wherein the at least one plunger assembly is receivable within the at least one cavity, wherein the first transducer is disposed between the at least one plunger assembly and the first planar surface of the at least one cavity when the at least one plunger assembly is received within the at least one cavity, wherein the second transducer is disposed between the at least one plunger assembly and the second planar surface of the at least one cavity when the at least one plunger assembly is received within the at least one cavity, and wherein the at least one plunger assembly is configured to translate a force to the at least one of the first transducer or the second transducer upon an application of force to the upper portion.

\* \* \* \* \*